United States Patent
Hammadou

(10) Patent No.: US 7,961,946 B2
(45) Date of Patent: Jun. 14, 2011

(54) METHOD AND SYSTEM FOR BACKGROUND ESTIMATION IN LOCALIZATION AND TRACKING OF OBJECTS IN A SMART VIDEO CAMERA

(75) Inventor: Tarik Hammadou, Surry Hills (AU)

(73) Assignee: DigiSensory Technologies Pty Ltd (AU)

( * ) Notice: Subject to any disclaimer, the term of this patent is extended or adjusted under 35 U.S.C. 154(b) by 1064 days.

(21) Appl. No.: 11/748,775

(22) Filed: May 15, 2007

(65) Prior Publication Data

US 2008/0285797 A1 Nov. 20, 2008

(51) Int. Cl.
*G06K 9/00* (2006.01)
(52) U.S. Cl. ........ 382/181; 382/173; 382/165; 382/164; 382/168; 348/143; 348/155; 348/669
(58) Field of Classification Search .................. 382/181, 382/173, 165, 164, 168; 348/143, 155, 669
See application file for complete search history.

(56) References Cited

U.S. PATENT DOCUMENTS

| | | | | |
|---|---|---|---|---|
| 7,143,434 | B1 * | 11/2006 | Paek et al. | 725/142 |
| 7,310,589 | B2 * | 12/2007 | Li | 702/179 |
| 2007/0081100 | A1 * | 4/2007 | Yui | 348/587 |

OTHER PUBLICATIONS

Smart camera for MPEG-7, O. Steiger, Lausanne, EPFL, 2001.*
International Preliminary Report on Patentability for International Patent Application No. PCT/AU2008/000674, mailed Nov. 26, 2009.
International Search Report corresponding to International Application Serial No. PCT/AU2008/000674, mailed Jul. 30, 2008, 4 pages.
Written Opinion of the International Searching Authority corresponding to International Application Serial No. PCT/AU2008/000674, mailed Jul. 30, 2008, 3 pages.
Steiger, "Smart camera for MPEG-7", Lausanne, EPFL, 2001.
Cavallaro et al., "Semantic video analysis for adaptive content delivery and automatic description", in IEEE Transactions on Circuits and Systems for Video Technology, Oct. 2005.
Steiger et al., "MPEG-7 Description of Generic Video Objects for Scene Reconstruction", in Visual Communication and Image Processing (VCIP) 2002, Proc. of SPIE, vol. 4671, pp. 947-958, Jan. 2002.
European Patent Office, Communication with Supplementary European Search Report, in Application No. 08747945.7, dated Aug. 24, 2010.
Manzanera et al. "A New Motion Detection Algorithm Based on SIGMA-DELTA Background Estimation", Pattern Recognition Letters, Elsevier, Amsterdam, NL LNKD-DOI:10.1016/J. Patrec.2006. 04.007, vol. 28, No. 3, Nov. 30, 2006, pp. 320-328, XP005785844, ISSN: 0167-8655, Section 2. "Sigma-Delta Estimation", Table 1.
Huter, Jane and Seyrat, Claude, "Description Definition Language"in: B.S. Manjunath et al. (Eds): "Introduction to MPEG-7" 2002, John Wiley and Sons, XP002593495, pp. 43-60.
Piccardi M Ed—Liu W T et al.: "Background Substraction Techniques: A Review", Systems, Man and Cybernetics, 2004 IEEE Piscataway, NJ, USA, vol. 4, Oct. 10, 2004, pp. 3099-3104, XP010773231, ISBN: 978-0-7803-8566-5.

* cited by examiner

*Primary Examiner* — Matt Bella
*Assistant Examiner* — Mike Rahmjoo
(74) *Attorney, Agent, or Firm* — McAndrews, Held & Malloy, Ltd.

(57) ABSTRACT

Aspects of a method and system for change detection in localization and tracking of objects in a smart video camera are provided. A programmable surveillance video camera comprises processors for detecting objects in a video signal based on an object mask. The processors may generate a textual representation of the video signal by utilizing a description language to indicate characteristics of the detected objects, such as shape, texture, color, and/or motion, for example. The object mask may be based on a detection field value generated for each pixel in the video signal by comparing a first observation field and a second observation field associated with each of the pixels. The first observation field may be based on a difference between an input video signal value and an estimated background value while the second observation field may be based on a temporal difference between first observation fields.

6 Claims, 20 Drawing Sheets

Original scene

Background

Video objects

METHOD AND SYSTEM FOR BACKGROUND ESTIMATION IN LOCALIZATION AND TRACKING OF OBJECTS IN A SMART VIDEO CAMERA

CROSS-REFERENCE TO RELATED APPLICATIONS/INCORPORATION BY REFERENCE

This application makes reference to:
U.S. application Ser. No. 11/107,671 filed on Apr. 15, 2005; and
U.S. application Ser. No. 11/219,951 filed on Sep. 6, 2005.

Each of the above stated applications is hereby incorporated by reference in its entirety.

FIELD OF THE INVENTION

Certain embodiments of the invention relate to security systems. More specifically, certain embodiments of the invention relate to a method and system for change detection in localization and tracking of objects in a smart video camera.

BACKGROUND OF THE INVENTION

The use of security and surveillance systems is becoming more widespread in modern society. In addition to providing security measures that protect assets and individuals in commercial, residential, and public settings, security and surveillance systems are also being adapted to improve the efficiency and versatility of processes and/or procedures in a variety of businesses. One important aspect of security and surveillance systems is the need for upgrade and/or maintenance operations. This is a necessary but generally cumbersome and costly aspect of providing security measures. Moreover, a great number of new security and surveillance applications may be implemented utilizing wireless technology that supports mobile security. This presents an even bigger challenge in terms of upgrade and/or maintenance operations given that cameras, sensors, and/or other equipment utilized by a security and surveillance system may be spread out over a wide geographic area. Many of the cameras and/or sensors, for example, may be operated as mobile devices and may therefore change locations. In some instances, providing upgrade and/or maintenance operations to a mobile security and surveillance system may result in reduced protection as certain portions of the system may need to be disabled while the upgrade and/or maintenance operation takes place.

Security and surveillance operations may require security management systems that are capable of providing either a single security function or, in some instances, a wide range of integrated security functions. Most security management systems, however, are designed to operate as autonomous systems that provide a single security function such as intrusion detection, access control, or audio and/or video surveillance and recording, for example. These security management systems may not generally support the addition of other security functions and/or the addition of other features to an existing security function without a substantial investment in hardware and/or software. As a result, multiple security management systems are generally utilized when a particular application requires multiple security functions. In this regard, any integration that may be necessary to efficiently and/or effectively operate multiple security management systems is typically left to an installer, an integrator, and/or the customer to carry out.

One of the needs driving security management systems capable of supporting a wide range of integrated security functions and/or features are security operations for large government agencies as well as large corporate entities. Corporate or governmental entities may have many different security requirements extending over multiple locations. A centrally monitored integrated security management system allows system administrators or controllers at a central control center to efficiently oversee the many security activities that are supported at remote facilities.

The limited ability of most security management systems to add security functions, to add features to existing security functions, and/or to easily integrate with other security management systems with complementary security functions generally results in an inefficient use of available resources. For example, multiple security management systems that have not been efficiently integrated may have multiple data entry points and/or duplicate databases. Moreover, limited integration capability may also create inefficient use of personnel by duplicating data entry tasks, requiring manual data exchange between systems, and implementing multiple training requirements for the various systems being utilized. Moreover, even when integration between multiple security management systems has been effectively implemented, continued compatibility may be lost when hardware and/or software on various portions of at least one of the multiple security management systems is upgraded.

A common security function that may need to be provided with either additional features or that may need to be compatible with other security functions is video surveillance. Most video surveillance operations are provided by stand-alone closed circuit television (CCTV) systems that are commonly found in, for example, office buildings, external structures, schools, railway stations, and even on city streets. An effective integrated security management systems may require that a CCTV system be compatible with other security functions such as access control methods augmented with biometrics, security tracking systems, and/or access tracking systems, for example. Moreover, video content analysis may be utilized to add additional security features to video surveillance. However, most CCTV systems and their components are not easily upgradable nor are they easily integrated with other security functionality. As a result, integrated security management systems comprising video surveillance operations are not readily available. Moreover, the ability of these integrated security management systems to evolve and provide further security functions and/or additional features are generally limited or may be accomplished only with a substantial investment in hardware and/or software.

A feature that may be of importance in CCTV or surveillance systems is the processing of video streams in a CCTV video camera. Most of the CCTV digital video cameras may utilize simple and cost effective image compression techniques such as JPEG or JPEG2000, for example, to process streams of video images (MJPEG). However, while video processing operations based on still-image algorithms like JPEG have performed sufficiently well for some video surveillance applications, more advanced systems such as integrated security management systems may require more advanced techniques. For example, current CCTV systems may utilize video compression techniques such as H.261, H.263 and MPEG standards that may utilize the links or correlated information that may exist between images of a sequence to provide more efficient compression. These techniques may enable easy storage of video content on digital media such as DVDs and/or access via the Internet.

However, even these advanced video compression techniques may prove somewhat limiting to the types of features needed in more advanced integrated security management systems that provide video surveillance operations. In this regard, the storing and processing efficiency of these systems may be significantly improved by adding understanding of the contents of the video stream in order to support more advanced operations such as automatic image classification and retrieval.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for change detection in localization and tracking of objects in a smart video camera, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for change detection in localization and tracking of objects in a smart camera. Aspects of the invention may comprise a programmable surveillance video camera that utilizes one or more processors for detecting objects in a video signal based on an object mask. The processors may generate a textual representation of the video signal by utilizing a description language to indicate characteristics of the detected objects, such as shape, texture, color, and/or motion, for example. The object mask may be based on a detection field value generated for each pixel in the video signal by comparing a first observation field and a second observation field associated with each of the pixels. The first observation field may be based on a difference between an input video signal value and an estimated background value while the second observation field may be based on a temporal difference between first observation fields. Note that the following discussion will generally use the terms "configuration" and "programming" interchangeably. Accordingly, the scope of various aspects of the present invention should not be limited by notions of difference between the terms "configuration" and "programming."

Figure 1A:
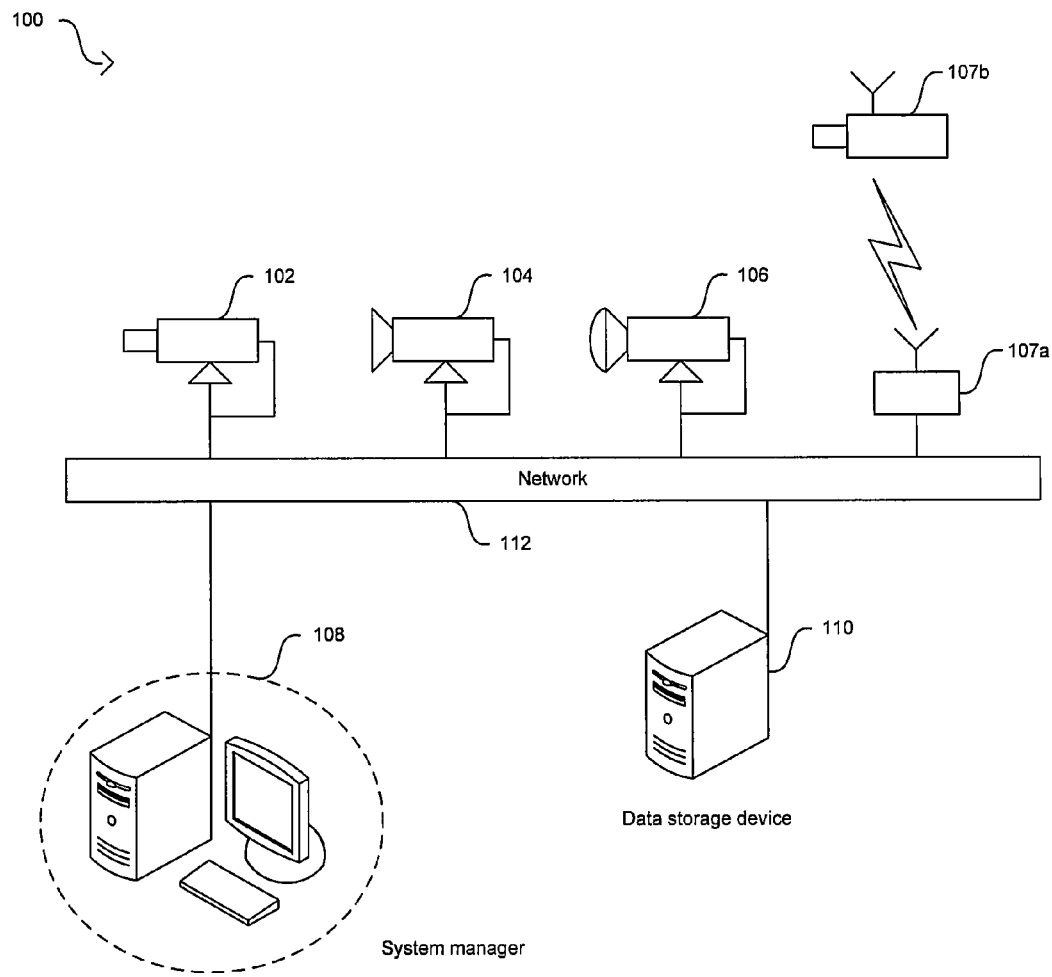
FIG. 1A illustrates an exemplary configurable security and surveillance system with programmable sensor agents, in accordance with an embodiment of the invention.

FIG. 1A illustrates an exemplary configurable security and surveillance system with programmable sensor agents, in accordance with an embodiment of the invention. Referring to FIG. 1A, there is shown a configurable security and surveillance system 100 that comprises a first programmable sensor agent 102, a second programmable sensor agent 104, a third programmable sensor agent 106, a system manager 108, a data storage device 110, a network 112, a wireless hub 107a, and a wireless programmable sensor agent 107b. The configurable security and surveillance system 100 need not be limited to the implementation described in FIG. 1A.

The network 112 may comprise suitable logic, circuitry, and/or code that may be enable communication between a plurality of components, devices, and/or elements. In this regard, the components, devices, and/or elements coupled to the network 112 may correspond to specified network address and/or network locations in the network 112. The network 112 may be a communication network that may be implemented as a local area network (LAN), a wide area network (WAN), a campus area network (CAN), a metropolitan area network (MAN), and/or a home area network (HAN), for example. The network 112 may be, for example, a transport control protocol/Internet protocol (TCP/IP) network, but need not be so limited. In some instances, at least portions of the network 112 may be implemented as wireless connections while remaining portions may be implemented as wireline connections. For example, at least a portion of the network may be implemented utilizing wireless LAN (WLAN) and/or Bluetooth technologies. Moreover, components communicatively coupled to the network 112 may be coupled via wireline or wireless connections, for example.

The first programmable sensor agent 102, the second programmable sensor agent 104, the third programmable sensor agent 106, and the wireless programmable sensor agent 107b may comprise suitable logic, circuitry, and/or code that may be enable detection of a physical event, generate at least one signal that corresponds to the physical event detected, and transfer the generated signal to the data storage device 210 and/or the system manager 208 via the network 112. These different types of programmable sensor agents are shown in FIG. 1A as examples to illustrate that a plurality of programmable sensor agent types may be utilized to detect different physical events, however aspects of the present invention need not be so limited. As a result, the types and the number of programmable sensor agents may depend on the security functions that need to be integrated in the configurable security and surveillance system 100. For example, a programmable sensor agent may correspond to a surveillance camera, a thermal sensor, or a biological/chemical sensor. In the example illustrated in FIG. 1A, each of the programmable sensor agents 102, 104, 106, and/or 107b may be associated with a specified network address in the network 112.

A programmable sensor agent may be enabled to receive control information from the system manager 108 via the network 112. Moreover, a programmable sensor agent may be enabled to be programmed or configured by the system manager 108. In this regard, the programming or configuration may be performed to add and/or remove features that correspond to a security function or functions performed by a programmable sensor agent. The programming or configuration may be performed dynamically, that is, while the configurable security and surveillance system 200 is in operation. In other instances, the programming or configuration may be performed during manufacturing or assembly of the programmable sensor agent, during installation or during maintenance periods when at least a portion of the configurable security and surveillance system 100 is not in operation.

The programmable sensor agents may comprise configurable devices, such as processors, application specific integrated circuits (ASICs), field programmable gate arrays (FPGAs), complex programmable logic devices (CPLD), for example. Configuration and/or programming of a programmable sensor agent may comprise configuring and/or programming at least a portion of a configurable device in the programmable sensor agent. When a programmable sensor agent utilizes more than one configurable device, the configuration and/or programming of a programmable sensor agent may comprise the configuration and/or programming of at least one of the configurable devices in the programmable sensor agent.

When a programmable sensor agent is a surveillance video camera, for example, it may comprise suitable logic, circuitry, and/or code that may be enable capture of video information or content and the transfer of the video information or content to the network 112. The surveillance video camera may be enabled to receive control information via the network 112. The surveillance video camera may comprise an image sensor, an image/color processor, and a compression engine. The image sensor may be, for example, a complementary metal-oxide-semiconductor (CMOS) image sensor or a charge-coupled device (CCD) image sensor and may be adapted to capture video information. The image processor may be, for example, a digital signal processor (DSP), a programmable device, such as an FPGA or CPLD, or a dedicated ASIC and may be enabled to perform front-end processing of the video information captured by the image sensor such as, for example, color and/or video content processing. In this regard, at least a portion of the image processor may operate as an automatic scene description engine that provides content-based interactivity to enable semantically meaningful information to be extracted from the video content with limited human input. The compression engine may comprise suitable logic, circuitry, and/or code that may be enabled to encode the processed video information before transfer to the network 112. In some instances, at least a portion of the image sensor, the image processor, and/or the compression engine may be integrated into a single integrated circuit (IC). The control information received by the surveillance video camera may also be utilized to control, for example, zoom, tilt, and/or pan operations.

The wireless hub 107a may comprise suitable logic, circuitry, and/or code that may be enabled to provide wireless communication between the wireless programmable sensor agent 107b and the network 112. In this regard, the wireless hub 107a may be adapted to support at least one wireless communication protocol, such as IEEE 802.11 wireless local area network (WLAN), global system for mobile communication (GSM), and/or Bluetooth, for example. In some instances, the wireless hub 107a may wirelessly communicate with more than one wireless programmable sensor agent 107b. The wireless programmable sensor agent 107b may comprise suitable logic, circuitry, and/or code that may be enabled to communicate wirelessly with the wireless hub 107a. In this regard, the wireless programmable sensor agent 107b may support at least one of the wireless communication protocols supported by the wireless hub 107a.

The data storage device 110 may comprise suitable logic, circuitry, and/or code that may enable storage of at least a portion of the signals generated by the programmable sensor agents. In some instances, the data storage device 110 may be part of a network attached storage (NAS) and/or a storage area network (SAN), for example. The data storage device 110 may correspond to a specified network address in the network 112. In some instances, more than one data storage device 110 may be utilized in the configurable security and surveillance system 100.

The system manager 108 may comprise suitable logic, circuitry, and/or code that may be enabled to control the operation of at least one of the programmable sensor agents in the configurable security and surveillance system 100. In this regard, the system manager 108 may generate control information that may be transferred to the programmable sensor agents via the network 112. The system manager 108 may also be adapted to display at least a portion of the information in the signals generated by the programmable sensor agents. Moreover, the system manager 108 may receive information stored in the data storage device 110 and may process and/or display the information received from the data storage device 110. The system manager 110 may correspond to a specified network address in the network 112. In some instances, at least some of the operations of the system manager 108 and/or the data storage device 110 may be implemented in a single network device.

The system manager 108 may also be enabled to program or configure security features into the programmable sensor agents in the configurable security and surveillance system 100. In this regard, the system manager may receive device programming files that may be utilized to program or configure a portion of the programmable sensor agents in order to provide new, additional, and/or upgraded security features. The device programming files may be transferred to the corresponding programmable sensor agents via the network 112. In some instances, the device programming files received by the system manager 108 may be encrypted or protected. When the device programming files are encrypted, the system manager 108 may receive at least one decryption key or password that may be utilized to decrypt the encrypted device programming files or to gain access to the device programming files. In this regard, encryption and protection may be substantially similar restrictions on the device programming files and may therefore be referred to interchangeably. When the device programming files have been decrypted, the system manager 108 may transfer the device programming files to the corresponding programmable sensor agents via the network 112.

The system manager 108 may also be enabled to execute code or software that may perform control, management, and/or maintenance operations that may be utilized in the operation and/or the configuration of the configurable security and surveillance system 100.

In operation, the system manager 108 may transfer a device programming file associated with a security measure or feature to a specified programmable sensor agent via the network 112 in accordance with an installation, upgrade and/or maintenance schedule. In some instances, a user may transfer a device programming file to a specified programmable sensor agent via the system manger 108 at times other than those provided in an installation, upgrade and/or maintenance schedule. After programming is completed and the specified programmable sensor agent has been properly configured, the system manager 108 may update any table and/or database that indicates the current features or measures being supported by the programmable sensor agents. In this regard, the system manager 108 may keep a detailed listing of all relevant information regarding the features, upgrades, configurations, and/or maintenanace provided to programmable sensor agents in the security and surveillance system 100.

Information generated by the programmable sensor agents may be transferred to the data storage device 110 via the network 112 for storage. The data storage device 110 may categorize, order, arrange, convert, and/or manipulate the data received to provide more efficient storage and search capabilities. The system manager 108 may access, via the network 112, information stored in the data storage device 110 for display and/or processing. In some instances, information generated by the programmable sensor agents may be transferred to the system manager 108 for display and/or processing and may then be transferred, after processing, for example, to the data storage device 110.

Figure 1B:
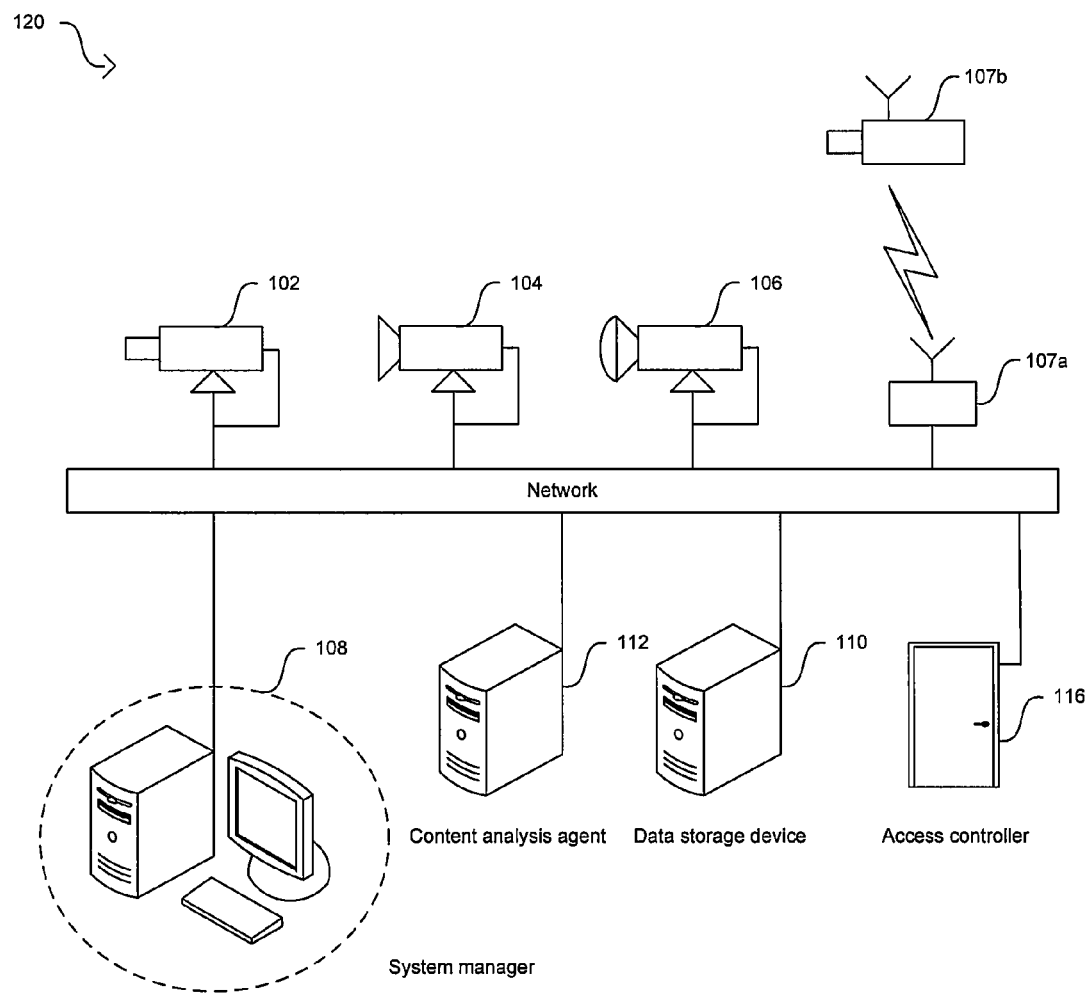
FIG. 1B illustrates an exemplary configurable security and surveillance system with programmable sensor agents and a programmable content management and analysis agent, in accordance with an embodiment of the invention.

FIG. 1B illustrates an exemplary configurable security and surveillance system with programmable sensor agents, a programmable content management and analysis agent, and an access controller, in accordance with an embodiment of the invention. Referring to FIG. 1B, there is shown a configurable security and surveillance system 120 that differs from the configurable security and surveillance system 100 in FIG. 1A in that a programmable content analysis agent 114 and an access controller 116 are shown communicatively coupled to the network 112.

The programmable content analysis agent 114 may comprise suitable logic, circuitry, and/or code that may be enabled to perform sensor analysis operations and/or security analysis operations. For example, sensor analysis operations may comprise, but need not be limited to, processing sensor information, classifying sensor information, and/or generating control information that may be transferred to other programmable sensor agents in the configurable security and surveillance system 120. Security analysis operations may comprise, but need not be limited to, identifying security anomalies, managing emergency situations, providing access control, and/or triggering alarms, for example. The results of sensor analysis operations may be utilized to generate and/or add information to a comprehensive knowledge base that may be utilized by, for example, the security analysis operations. In this regard, the programmable content analysis agent 114 may store at least a portion of the results generated by the sensor analysis operations. Storage of the results generated by the sensor analysis operations may be local on the programmable content analysis agent 114 and/or on the data storage device 110. The programmable content analysis agent 114 may correspond to a specified network address in the network 112. In some instances, more than one programmable content analysis agent 114 may be utilized by the configurable security and surveillance system 120.

The programmable content analysis agent 114 may also be enabled to receive and/or process semantically meaningful information, such as descriptors, that may be generated by any of the programmable sensor agents 102, 104, 106, and/or 107b. In this regard, semantically meaningful information may be received from any type of sensor, such as, gas sensors, video sensors, biological sensors, audio sensors, and/or any other sensor from which metadata may be extracted. For example, when a programmable sensor agent is a surveillance video camera, the programmable content analysis agent 114 may receive semantically meaningful information, in the form of scene descriptors, that has been extracted from the video stream by, for example, an image processor integrated within the surveillance video camera. The semantic information may utilize descriptors to represent various characteristics of objects that comprise the video stream. The semantic information may be provided separate from or instead of the pixel and frame information associated with the video stream. In this regard, the programmable content analysis agent 114 may utilize the semantically meaningful information to enable efficient automatic image classification and/or image retrieval operations, for example.

The programmable content analysis agent 114 may also be enabled to receive control information from the system manager 108 via the network 112. Moreover, the programmable content analysis agent 114 may be enabled to be programmed or configured by the system manager 108. In this regard, the programming or configuration may be performed to add, remove, and/or upgrade features that correspond to the sensor analysis operations and/or security analysis operations performed by the programmable content analysis agent 114. The programming or configuration may be performed dynamically, that is, while the configurable security and surveillance system 120 is in operation. In other instances, the programming or configuration may be performed during manufacturing or assembly, during installation or during maintenance periods when at least a portion of the configurable security and surveillance system 120 is not in operation. In some instances, at least some of the operations of the system manager 108, the programmable content analysis agent 114 and/or the data storage device 110 may be implemented in a single network device.

The access controller 116 may comprise suitable logic, circuitry, and/or code that may be enabled to provide access to specified locations based on a verified security clearance. For example, upon keycard and/or biometric information verification, a user may enter a specified location or site in a building or campus covered by the configurable security and surveillance system 120. Access to that area by the user may be further detected by, for example, video surveillance functions provided by at least one programmable sensor agent located in the specified location or site. The programmable sensor agents may transfer information, such as semantically meaningful information, for example, regarding the user to the programmable content analysis agent 114. The programmable content analysis agent 114 may process the user information and may add the results to other information that may have been generated on that user and that may be currently stored in the programmable content analysis agent 114 and/or in the data storage device 110. A user may be represented by a label in the configurable security and surveillance system 120 and the user label may correspond to a data structure comprising information related that user.

In another example, security and/or emergency personnel may be searching or attempting to locate a specified user. In this regard, the security and/or emergency personnel may query the configurable security and surveillance system 120 by label to locate the specified user. Data available on the data structure that corresponds to the user label may be utilized to accurately determine of the user's location. When additional data is required, the configurable security and surveillance system 120 may send control information to at least a portion of the programmable sensor agents and/or the access controller 116 to obtain additional data that may be utilized to locate the specified user.

The access controller 116 may provide an additional security function to the other security functions, for example, video surveillance, performed by the configurable security and surveillance systems 120. The system manager 108 may control this additional security function, at least in part. Moreover, the programmable content analysis agent 114 may be utilized to integrate at least a portion of the access control functions and other security functions.

Figure 2A:
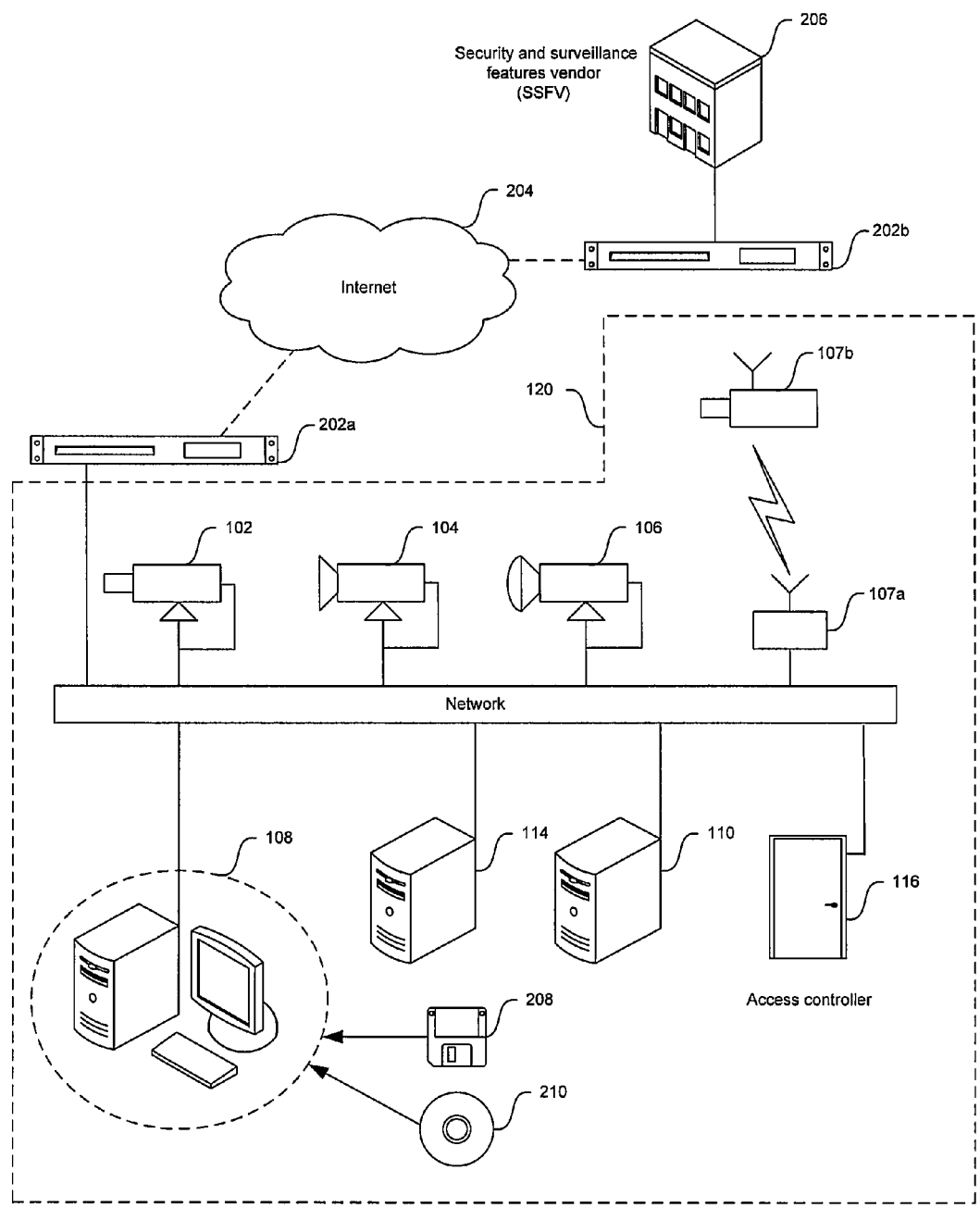
FIG. 2A illustrates an exemplary network comprising a configurable security and surveillance system and an e-commerce vendor, in accordance with an embodiment of the invention.

FIG. 2A illustrates an exemplary network comprising a configurable security and surveillance system and an e-commerce vendor, in accordance with an embodiment of the invention. Referring to FIG. 2A, there is shown the configurable security and surveillance system 120 as disclosed in FIG. 1B, a security and surveillance features vendor (SSFV) 206, a first machine-readable media 208, a second machine-readable media 210, a first router 202a, a second router 202b, and a TCP/IP network 204.

The first router 202a may comprise suitable logic, circuitry, and/or code that may be enabled to communicatively couple the network 112 in the configurable security and surveillance system 120 to the TCP/IP network 204. The second router 202b may comprise suitable logic, circuitry, and/or code that may be enabled to communicatively couple the SSFV 206 to the TCP/IP network 204.

The first machine-readable media 208 and the second machine-readable media 210 are illustrative examples of media that may be utilized to provide the configurable security and surveillance system 120 with device programming files, decryption keys, and/or operating software or code that may be utilized by the system manager 108, the programmable content analysis agent 114, the data storage device 110, and/or the access controller 116. While the first machine-readable media 208 as shown corresponds to at least one diskette and the second machine-readable media 210 as shown corresponds to at least one optical disk, aspects of the invention need not be so limited and other machine-readable media may also be utilized in this regard.

The SSFV 206 may be an e-commerce vendor that provides a plurality of features that may be programmed into a programmable sensor agent in the configurable security and surveillance system 120. Moreover, the SSFV 206 may provide device programming files, decryption keys, and/or operating software or code that may be utilized by the programmable sensor agents 102, 104, 106, 107b, the system manager 108, the programmable content analysis agent 114, the data storage device 110, and/or the access controller 116. The SSFV 206 may be enabled to receive requests for device programming files, decryption keys, and/or operating software or code that may be utilized to configure or program at least a portion of the configurable security and surveillance system 120. Decryption keys may be requested from the SSFV 206 when at least a portion of the device programming files is encrypted. The SSFV 206 may transfer any requested device programming files and/or decryption keys to the system manager 108 via the TCP/IP network 204 and the network 112, for example. In some instances, the SSFV 206 may provide any requested device programming files and/or decryption keys to the system manager 108 via at least one machine-readable media.

Figure 2B:
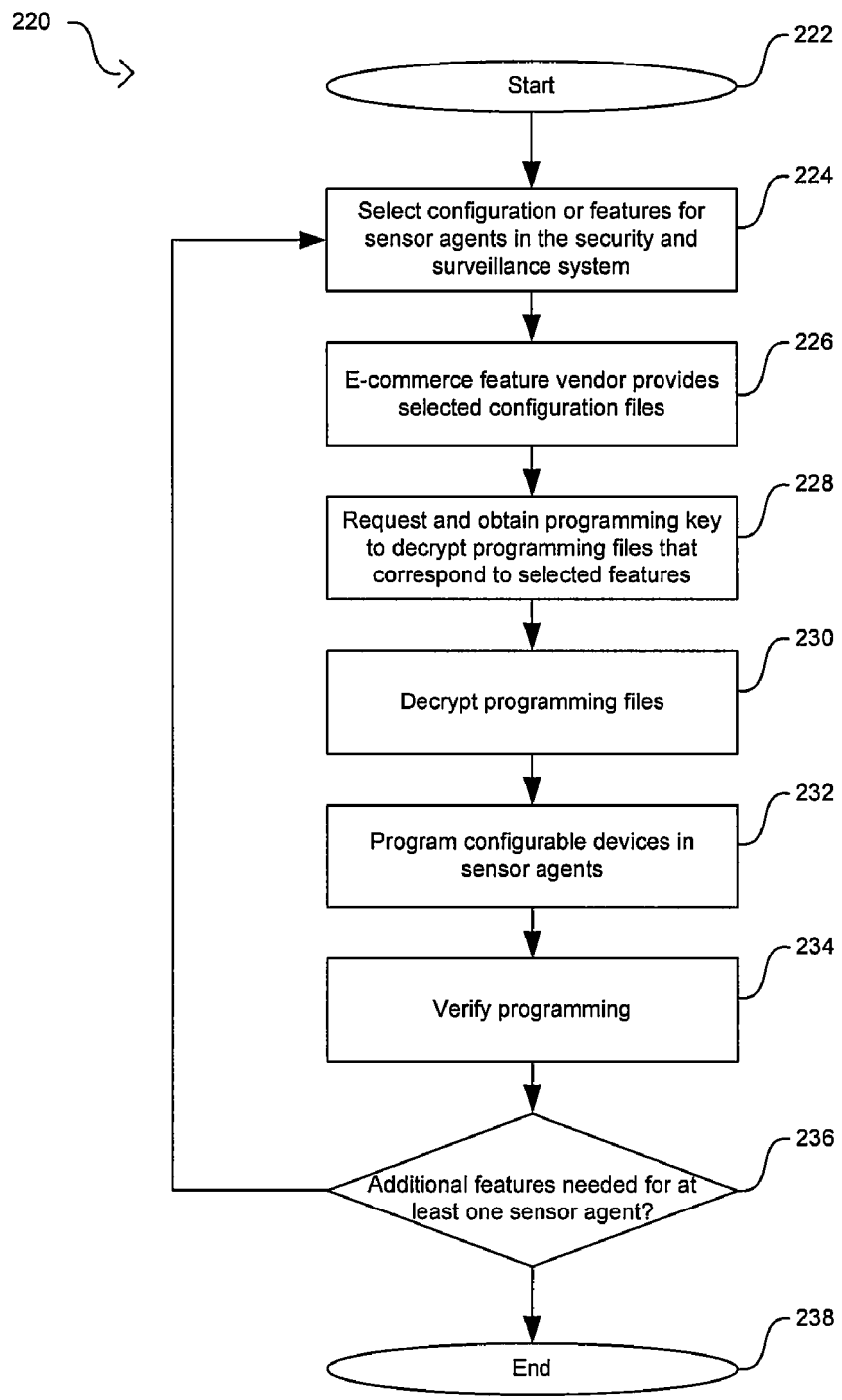
FIG. 2B is a flow diagram illustrating exemplary steps for configuring a programmable sensor agent, in accordance with an embodiment of the invention.

FIG. 2B is a flow diagram illustrating exemplary steps for configuring a programmable sensor agent, in accordance with an embodiment of the invention. Referring to FIG. 2B, after start step 222, in step 224, features may be selected that may be programmed into at least one configurable device, such as DSPs, FPGAs, CPLDs, or ASICs, in at least one programmable sensor agent in a configurable security and surveillance system, such as the configurable security and surveillance system 120. In step 226, an e-commerce feature vendor may provide device programming files for the selected features. The device programming files may be transfer to the configurable security and surveillance system via a network connection and/or via machine-readable media. In step 228, decryption or programming keys may be requested and obtained from the e-commerce feature vendor for device programming files that are encrypted. The decryption keys may be provided to the configurable security and surveillance system via a network connection and/or via machine-readable media.

In step 230, the encrypted device programming files may be decrypted by utilizing the decryption keys received in step 228. In step 232, the device programming files may be transferred to the programmable sensor agents to program the configurable devices. In step 234, the programming of the configurable devices in the programmable sensor agents may be verified. In step 236, a user and/or installer of the configurable security and surveillance system may determine whether new, additional, and/or upgraded features may be necessary in at least one programmable sensor agent. When a user may find that new, additional, and/or upgraded features are necessary, the flow chart 220 may proceed to step 224 where new, additional, and/or upgraded features may be selected. When a user may not require new, additional, and/or upgraded features, the flow chart 220 may proceed to end step 238.

Figure 3A:
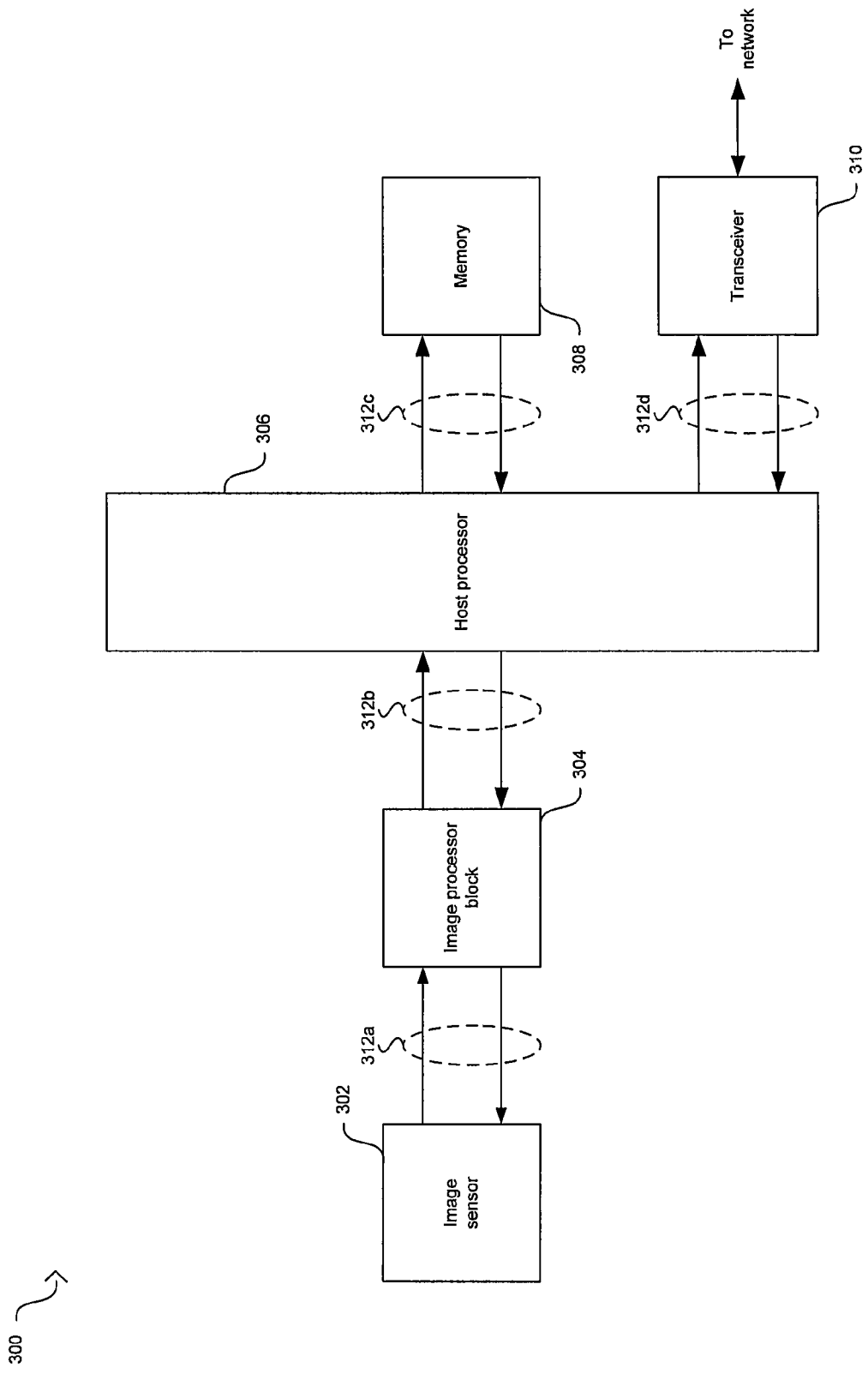
FIG. 3A is a block diagram illustrating an exemplary programmable surveillance video camera for a configurable security and surveillance system, in accordance with an embodiment of the invention.

FIG. 3A is a block diagram illustrating an exemplary programmable surveillance video camera for a configurable security and surveillance system, in accordance with an embodiment of the invention. Referring to FIG. 3A, there is shown a programmable sensor agent 300 that may comprise an image sensor 302, an image processor block 304, a host processor 306, a memory 308, and a transceiver 310. Communication of control and/or data information between components in the programmable sensor agent 300 may be performed via signals 312a, ..., 312d. For example, signals 312a may be utilized to transfer control and/or data information between the image sensor 302 and the image processor block 304, signals 312b between the image processor block 304 and the host processor 306, signals 312c between the host processor 306 and the memory 308, and signals 312d between the host processor 306 and the transceiver 310.

The image sensor 302 may comprise suitable logic, circuitry, and/or code that may be enable to perform image capture operations. The image sensor 302 may also be adapted to perform processing on the captured image information. For example, the image sensor 302 may be adapted to perform analog and/or digital processing on a captured image. Moreover, the image sensor 302 may be adapted to modify its analog and/or digital processing in accordance with control signals received from the image processor block 304. The image sensor 302 may be a CCD imager, a CMOS imager, or another type of solid-state imager, such as, for example, a gallium arsenide (GaAs) image sensor. The image sensor 302 may be enabled to provide monochrome, color, infrared (IR), and/or terahertz (THz) information of the captured image. For example, an IR-based imager may be utilized for gathering thermal information of the captured image. In another example, a THz-based imager may be utilized for security imaging operations.

The image processor block 304 may comprise suitable logic, circuitry, and/or code that may be enabled to process image information captured by the image sensor 302. The image processor block 304 may be enabled to provide image processing and/or image compression operations, for example. At least some of the features and/or operations provided by the image processor block 304 may be configured or programmed via the host processor 306. In this regard, the operations performed by the image processor block 304 may be upgraded and/or modified at least by the operations disclosed in FIGS. 2A-2B. The image processor block 304 may be enabled to, for example, convert the video to a lower bit rate, to a lower or higher spatial resolution, and/or to a different video format such as PAL or NTSC format.

The image processor block 304 may be enabled to generate semantically meaningful information in the form of descriptors from the video stream by, for example, detecting, characterizing, localizing, and/or tracking objects and/or other video content within the video stream over time. The semantic information may be provided by the image processor block 304 separate from or instead of the pixel and frame information associated with the video stream. In this regard, the image processor block 304 may be programmed to provide the processed video stream and/or video scene descriptors.

The host processor 306 may comprise suitable logic, circuitry, and/or code that may be enable management and/or control of the operations of the programmable sensor agent 300. In this regard, the host processor 306 may receive processed information from the image processor block 304 and may transfer the processed information to the memory 308 for storage and/or the transceiver 310 for transmission to the network 112, for example. The host processor 306 may also be enabled to receive information from the transceiver 310 and transfer the received information to the memory 308 for storage and/or to the image processor block 304. For example, the host processor 306 may receive configuration files and may utilize the configuration files to configure or program at least a portion of the image processor block 304. The host processor 306 may receive startup information from the memory 308, where the startup information may comprise device programming files that may be utilized to configure or program at least a portion of the image processor block 304 during a startup mode of the programmable sensor agent 300.

The memory 308 may comprise suitable logic, circuitry, and/or code that may be enable storage of information. The memory 308 may comprise at least one memory device or chip, where a memory device may be a random access memory (RAM), a read only memory (ROM), a flash memory, and/or other types of non-volatile memory. The memory 308 may be utilized to store, for example, temporary information needed by the host processor 306 for control and/or management operations, to store device programming files, to store intermediate data for image processing, and/or to store startup information needed for a startup mode of operation of the programmable sensor agent 300. In instances where a failure in the operation of the programmable sensor agent 300 is detected, a status of at least some of the conditions that lead to the failure may be stored in the memory 308 for servicing or repair operations.

The transceiver 310 may comprise suitable logic, circuitry, and/or code that may be enabled to modify and/or adapt information received from the network 112 to be transferred to the host processor 306 via the signals 312d. The transceiver 310 may also be enabled to modify and/or adapt information received from the host processor 306 via the signals 312d to be transferred to the network 112. The transceiver 310 may be adapted to communicate with the network 112 via a wireless or a wireline connection. The transceiver 310 may be, for example, an Ethernet transceiver.

During video or image capture operations, for example, the image processor block 304 may generate signals that control the operation of the image sensor 302. The image sensor 302 may capture image information based on received control signals and may transfer the captured image information to the image processor block 304. The image processor block 304 may process and/or compress the image information. The image processor block 304 may transfer the processed and/or compressed image information to the host processor 306. The host processor 306 may transfer the processed and/or compressed image information to the memory 306 and/or to the transceiver 310.

During startup operations, for example, the host processor 306 may receive a startup device programming file from the memory 308. The host processor 306 may program the image processor block 304 based on the startup device programming file. The host processor 306 may verify that the programming or configuration of the image processor block 304 has been completed successfully. When the programming or configuration has been completed successfully, the host processor 306 may generate a signal to indicate that the programming or configuration has been verified. The verification signal may be transferred to the system manager 108, for example, via the network 112. The system manager 108 may, for example, update its database to indicate that a specified programmable sensor agent has been successfully configured during startup operations.

During installation, upgrade and/or maintenance operations, for example, the host processor 306 may receive a device programming file from the transceiver 310. The host processor 306 may program the image processor block 304 based on the device programming file. The host processor 306 may verify that the programming or configuration of the image processor block 304 has been completed successfully. When the programming or configuration has been completed successfully, the host processor 306 may generate a signal to indicate that the programming or configuration has been verified. The verification signal may be transferred to the system manager 108, for example, via the network 112. The system manager 108 may, for example, update its database to indicate that a specified programmable sensor agent has been successfully configured during upgrade and/or maintenance operations.

Figure 3B:
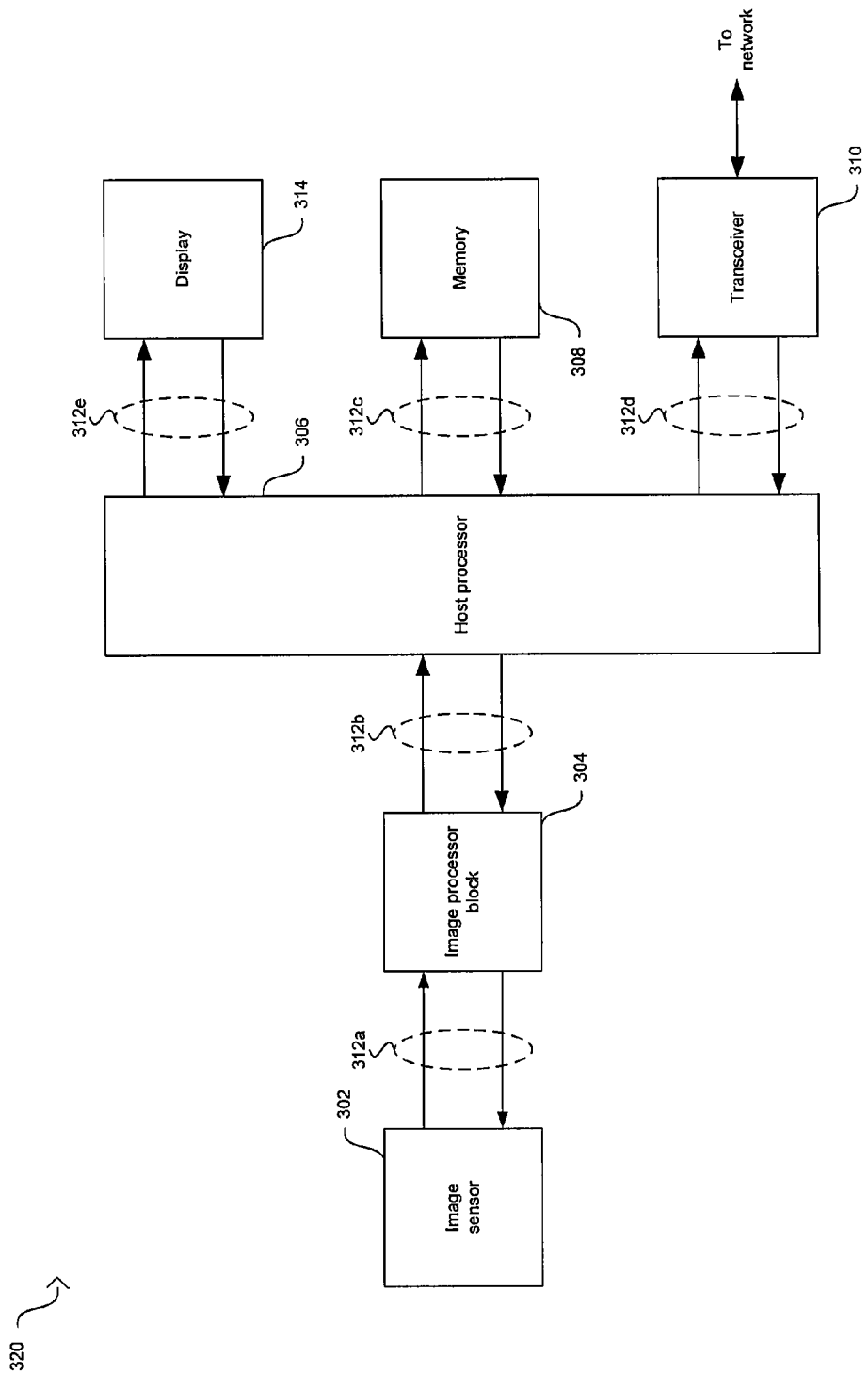
FIG. 3B is a block diagram illustrating an exemplary programmable surveillance video camera with a display, in accordance with an embodiment of the invention.

FIG. 3B is a block diagram illustrating an exemplary programmable surveillance video camera with a display, in accordance with an embodiment of the invention. Referring to FIG. 3B, a programmable sensor agent 320 is shown that comprises a display 314. The programmable sensor agent 320 may also comprise the image sensor 302, the image processor block 304, the host processor 306, the memory 308, and the transceiver 310 substantially as disclosed in FIG. 3A. Signals 312e may be utilized to transfer control and/or data information between host processor 306 and the display 314, for example. The display 314 may also be referred to as a display interface. The display 314 may comprise suitable logic, circuitry, and/or code that may be enabled to display information associated with the operation of the programmable sensor agent 320. For example, the display 314 may be utilized to display the version or date of the device programming files utilized for configuring portions of the programmable sensor agent 320, to display a version or date of software or code utilized for operating the programmable sensor agent 320, to display a current mode of operation, to display networking information, and/or to display features supported by the programmable sensor agent 320, for example.

The display 314 may also be enabled to be an interactive display. In this regard, a user, such as a camera installer, for example, may utilize the display 314 to update device programming files, to modify, add, and/or remove features from the programmable sensor agent 320, and/or to verify and/or modify networking information associated with the programmable sensor agent 320. The programmable sensor agent 320 may utilize touch-screen and/or soft button implementations to interface with the display 314, for example. The display 314 may also be utilized as an interface to the system manager 108. In this regard, device programming files in the system manager 108 may be requested by a user via the display 314 and may be transferred to the programmable sensor agent 320 via the network 112 and the transceiver 310, for example.

Figure 3C:
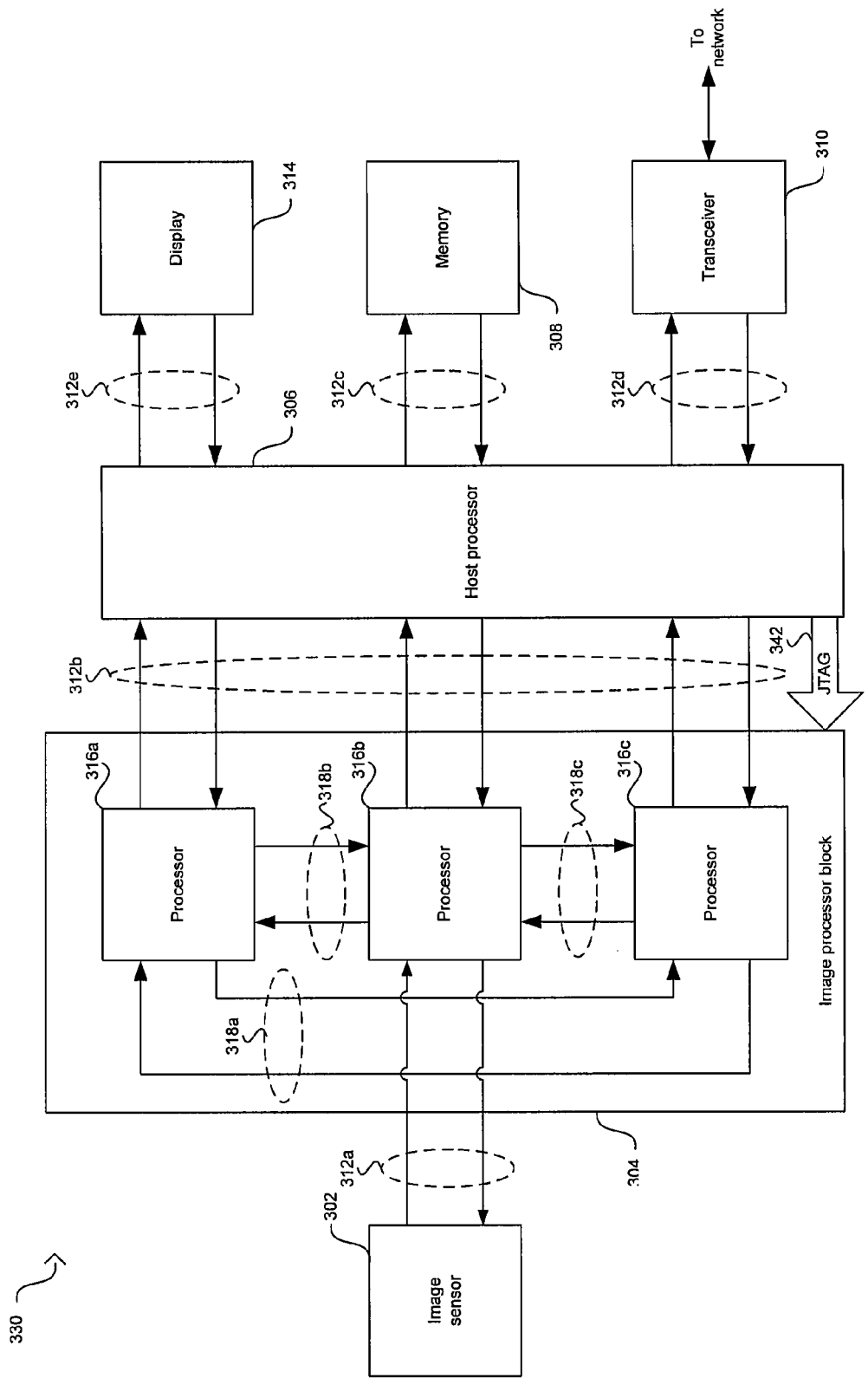
FIG. 3C is a block diagram illustrating an exemplary image processor in a programmable surveillance video camera, in accordance with an embodiment of the invention.

FIG. 3C is a block diagram illustrating an exemplary image processor in a programmable surveillance video camera, in accordance with an embodiment of the invention. Referring to FIG. 3C, there is shown a programmable sensor agent 330 with the image processor block 304 comprising a first processor 316a, a second processor 316b, and a third processor 316c. The programmable sensor agent 330 may also comprise the image sensor 302, the host processor 306, the memory 308, the transceiver 310, and the display 314 substantially as disclosed in FIGS. 3A-3B. The first processor 316a, the second processor 316b, and the third processor 316c may comprise suitable logic, circuitry, and/or code that may be configured or programmed to perform image processing and/or compression operations based on device programming files. The first processor 316a, the second processor 316b, and the third processor 316c may also be referred to as configurable devices. Configurable devices may correspond to DSPs, FPGAs, CPLDs, ASICs, and/or other type of integrated circuit (IC), such as a system-on-a-chip (SoC) which may be at least partially configurable. The image processor block 304 need not be limited to an implementation that utilizes three configurable devices as shown in this illustrative example. Accordingly, the image processor block 304 may be implemented with at least one configurable device.

Signals 312b may be utilized to transfer control and/or data information between the host processor 306 and the first processor 316a, the second processor 316b, and the third processor 316c. In this regard, the host processor 306 may be utilized to configure or program device programming files into at least a portion of each of the first processor 316a, the second processor 316b, and the third processor 316c. The host processor 306 may be utilized to verify that the configuration or programming has been completed successfully.

The host processor 306 may configure or program at least a portion of the first processor 316a, the second processor 316b, and/or the third processor 316c based on a boundary-scan in-system programming joint test action group (JTAG) signal 342, for example. The JTAG signal may be utilized to program or configure the configurable devices in the image processor block 304 and to verify that the programming or configuration has been completed successfully. Notwithstanding, aspects of the invention need not be so limited and other signals may also be utilized for configuration and/or verification of any portion of the programmable sensor agent 330.

The processing operations performed by the image processor block 304 may be partitioned or separated among its configurable devices, that is, the first processor 316a, the second processor 316b, and the third processor 316. For example, image capture processing chain operations may be performed by the second processor 316b after receiving image data from the image sensor 302 via the signals 312a. The signals 312a may be implemented utilizing an I2C or a serial bus, for example. In this regard, a device programming file that comprises an intellectual property (IP) core for image capture processing chain operations may be transferred to the second processor 316b from the host processor 306. The image capture processing chain may comprise a color correction operation, an image interpolation operation, and/or an image enhancement operation. Each of the operations in the image capture processing chain may be implemented in a separate IP core, for example.

The second processor 316b may be, for example, an FPGA, a CPLD, or a custom-made reconfigurable chip with embedded SRAM and/or FLASH memory that enables, for example, JTAG programming via the host processor 306. In this regard, a device programming file utilized to configure the second processor 316b may comprise VHDL or RTL information, for example. The IP core comprising the image capture processing chain may be compiled onto the second processor 316b and the host processor 306 may verify that the programming operation was completed successfully.

The first processor 316a may be utilized, for example, for image analysis, system failure management, and/or maintenance operations. Image analysis features may be upgraded in accordance with the security measures supported by the programmable sensor agent 330. An example of an image analysis feature is detection of dirt on the lens of the camera. When dirt is detected, the first processor 316a may generate a signal that may be transferred to the system manager 108 to indicate that the lens needs to be cleaned. The first processor 316a may receive a device programming file that comprises an IP core for image analysis, system failure management, and/or maintenance operations. In some instances, multiple IP cores may be programmed into the first processor 316a. The first processor 316a may also be adapted to determine, based on image analysis, when a dangerous situation may be occurring. In this regard, the first processor 316a may be adapted to generate a signal that may be utilized to enable or activate a mechanism, such as an electromagnetic shock, for example, that may be utilized to neutralize the dangerous situation. In this regard, the programmable sensor agent 330 may comprise a built-in device that supports the application of the electromagnetic shock.

The first processor 316a may be, for example, an FPGA, a CPLD, or a custom-made reconfigurable chip with embedded SRAM and/or FLASH memory that enables JTAG programming via the host processor 306. In this regard, a device programming file utilized to configure the first processor 316a may comprise VHDL or RTL information, for example. The IP core comprising the image analysis, system failure management, and/or maintenance operations may be compiled onto the first processor 316a and the host processor 306 may verify that the programming operation was completed successfully. The first processor 316a may be adapted to receive data and/or control information from the second processor 316b and the third processor 316c via signals 318b and 318a respectively.

The third processor 316c may be utilized, for example, to receive processed captured image data and generate semantically meaningful data content descriptors that may be utilized for, for example, automatic image classification and/or system image retrieval. In this regard, the third processor 316c may implement a compression operation, such as the motion pictures expert group 7 (MPEG-7) standard, for example, to generate at least a portion of the content descriptors. The data content descriptors may comprise motion, color, location, texture, and/or shape descriptors, for example. A compression operation may be utilized to generate the motion descriptors. The generation and type of data content descriptors may vary in accordance with a particular security feature or security operation. The third processor 316b may receive a device programming file that comprises an IP core for generating data content descriptors.

The third processor 316c may be, for example, an FPGA, a CPLD, or a custom-made reconfigurable chip with embedded SRAM and/or FLASH memory that enables JTAG programming via the host processor 306. In this regard, a device programming file utilized to configure the third processor 316c may comprise VHDL or RTL information, for example. The IP core comprising operations for generating data content descriptors via the MPEG-7 standard and/or modifications to the MPEG-7 standard may be compiled onto the third processor 316c and the host processor 306 may verify that the programming operation was completed successfully. The third processor 316c may be adapted to receive data and/or control information from the second processor 316b and the first processor 316a via signals 318c and 318a respectively.

Figure 3D:
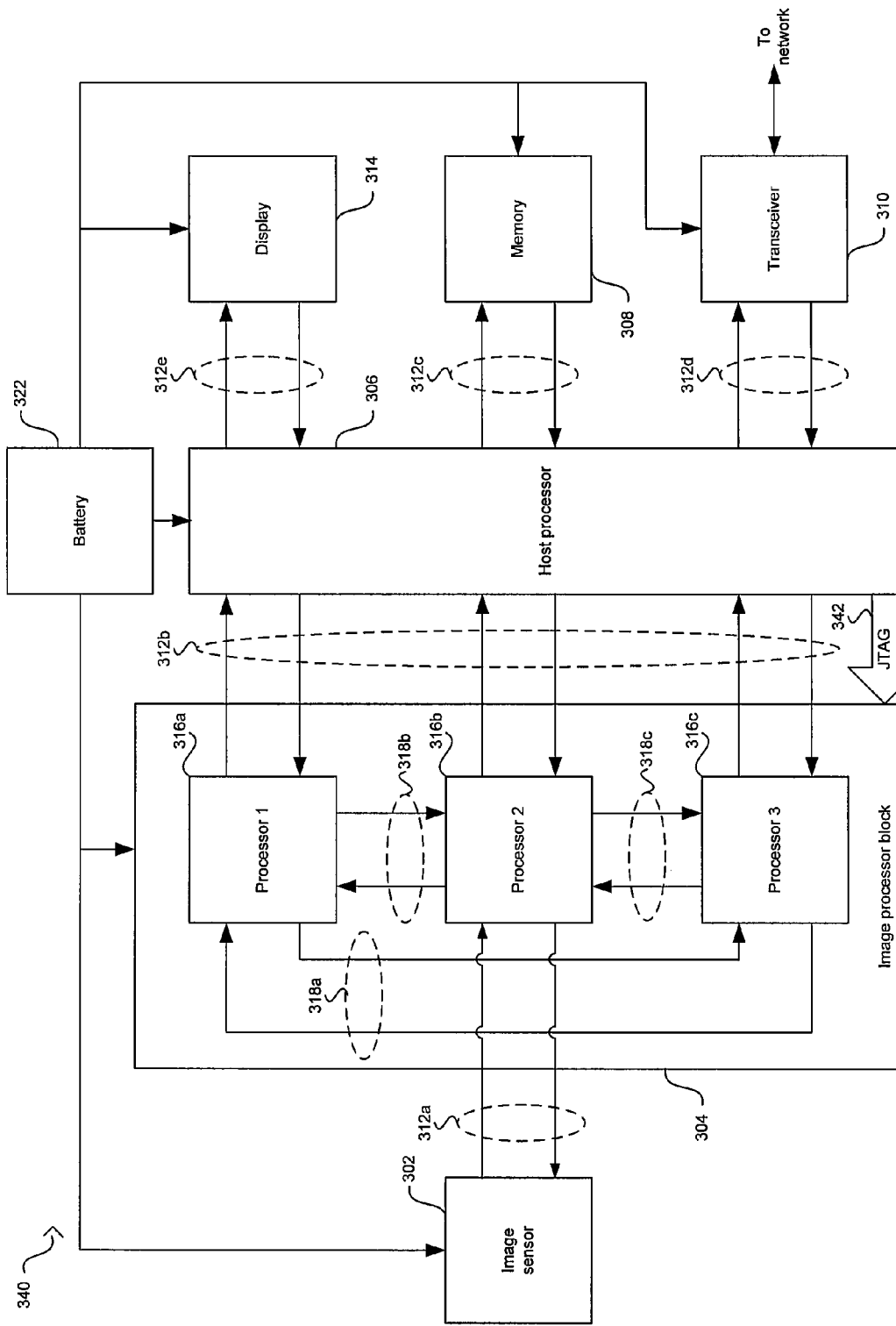
FIG. 3D is a block diagram illustrating an exemplary battery backup system for a programmable surveillance video camera, in accordance with an embodiment of the invention.

FIG. 3D is a block diagram illustrating an exemplary battery backup system for a programmable surveillance video camera, in accordance with an embodiment of the invention. Referring to FIG. 3D, there is shown a programmable sensor agent 340 with a battery 322. The programmable sensor agent 340 may also comprise the image sensor 302, the image processor block 304, the host processor 306, the memory 308, the transceiver 310, and the display 314 substantially as disclosed in FIGS. 3A-3C. The battery 322 may comprise suitable logic and/or circuitry that may be adapted to provide backup power to the programmable sensor agent 340 in instances when the source of power is disrupted. In this regard, the battery 322 may be selected to provide sufficient power to operate the programmable sensor agent 340 for a specified duration of time. The first processor 316a, when adapted to perform system failure management, may comprise a feature that generates a signal that enables the battery 322 to be activated as a backup power supply during power supply failure, for example.

Figure 3E:
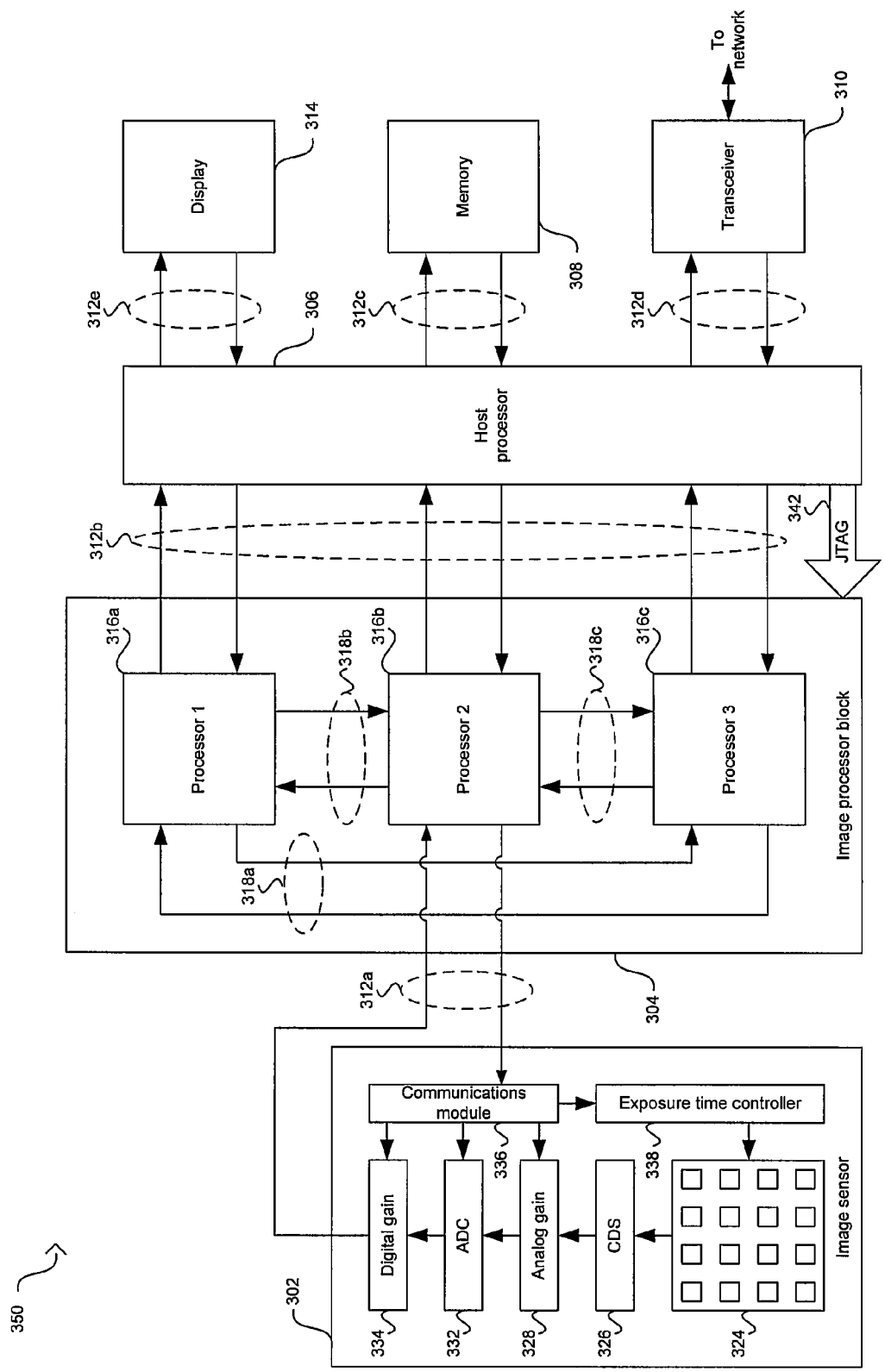
FIG. 3E is a block diagram illustrating an exemplary image sensor in a programmable surveillance video camera, in accordance with an embodiment of the invention.

FIG. 3E is a block diagram illustrating an exemplary image sensor in a programmable surveillance video camera, in accordance with an embodiment of the invention. Referring to FIG. 3E, there is shown a programmable sensor agent 350 with the image sensor 302 comprising a pixel array 324, a correlated double sampler (CDS) 326, an analog gain 328, an analog-to-digital converter (ADC) 332, a digital gain 334, a communications module 336, and an exposure time controller 338. The programmable sensor agent 350 may also comprise the image processor block 304, the host processor 306, the memory 308, the transceiver 310, and the display 314 substantially as described in FIGS. 3A-3C.

The pixel array 324 may comprise suitable logic and/or circuitry that may be enabled to convert electromagnetic energy into an analog signal. In this regard, the pixel array 324 may comprise a plurality of pixel elements. In some instances, the pixel array 324 may be adapted to perform analog-to-digital conversion at each pixel element. The exposure time controller 338 may comprise suitable logic, circuitry, and/or code that may be enabled to generate exposure and control signals that may be transferred to the pixel array 324. The exposure and control signals may be utilized to control the time and rate of exposure of the pixel element, image windowing, and/or night mode operations, for example. The CDS 326 may comprise suitable logic and/or circuitry that may be enabled to perform correlated double sampling on the analog signals generated by the pixel array 324.

The analog gain 328 may comprise suitable logic and/or circuitry that may be enabled to amplify the analog signals generated by the CDS 328. The gain in the analog gain 328 may be set based on register settings in the communications module 336. The ADC 332 may comprise suitable logic and/or circuitry that may be enabled to convert analog signals to digital signals. Some control and/or reference signals in the ADC 332 may be set based on register settings in the communications module 336. The digital gain 334 may comprise suitable logic and/or circuitry that may be adapted to amplify a digital signal. The gain in the digital gain 334 may be set based on register settings in the communications module 336. Digital information from the digital gain 334 may be transferred to the second processor 316b from the image sensor 302 via the signals 312a for processing.

The communications module 336 may comprise suitable logic, circuitry, and/or code that may be enabled to receive information from the second processor 316b when the second processor 316b is adapted to perform an image capture processing chain. The communications module 336 may comprise at least one register that may be utilized to control the operation of the CDS 326, the analog gain 328, the ADC 332, the digital gain 334, and/or the exposure time controller 338. In this regard, information received from the second processor 316b may be stored in the registers in the communications module 336. The communications module 336 may communicate with the second processor 316 via an I2C or serial bus, for example. In some instances, the information received by the communications module 336 may have been sent from the display 314 and/or from the system manager 108 via the network 112.

Figure 4A:
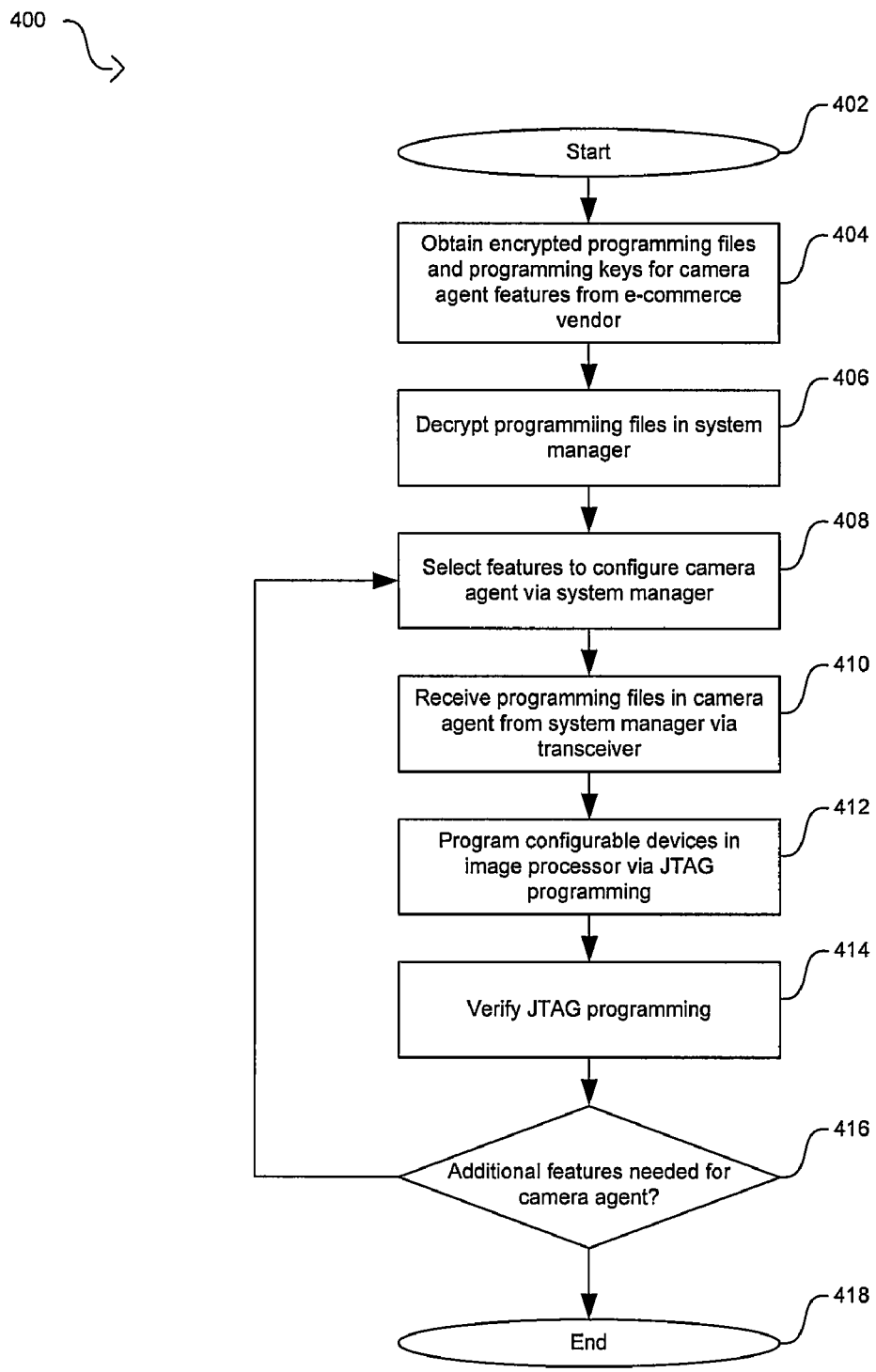
FIG. 4A is a flow diagram illustrating exemplary steps for configuring a programmable surveillance video camera via a system manager, in accordance with an embodiment of the invention.

FIG. 4A is a flow diagram illustrating exemplary steps for configuring a programmable surveillance video camera via a system manager, in accordance with an embodiment of the invention. Referring to FIG. 4A, after start step 402, in step 404, features that may be programmed into at least one configurable device in at least one programmable sensor agent in a configurable security and surveillance system may be provided by an e-commerce feature vendor. Decryption keys may be requested and obtained from the e-commerce feature vendor for device programming files that are encrypted. The device programming files and/or decryption keys may be provided to the configurable security and surveillance system via a network connection and/or via machine-readable media.

In step 406, the encrypted device programming files may be decrypted by utilizing the decryption keys received in step 404. In step 408, security features may be selected for configuration into specified programmable sensor agents via the system manager 108 by selecting the corresponding device programming files for transfer to the specified programmable sensor agents. In step 410, the specified programmable sensor agents receive the selected device programming files from the system manager 108. In this regard, each of the specified programmable sensor agents receives the device programming files via the transceiver 310. In step 412, the configurable devices in the image processor block 304 may be programmed by utilizing the device programming files received in step 410. The configurable devices may be programmed via the JTAG port in the host processor 306. In step 414, the host processor 306 may verify the programming of the configurable devices in the programmable sensor agents.

In step 416, a user, installer, and/or system manager may determine whether new, additional, and/or upgraded features may be necessary in at least one programmable sensor agent. When a user may find new, additional, and/or upgraded features necessary, the process may proceed to step 408 where a selection may be made via the system manager 108. When a user may not require new, additional, and/or upgraded features in at least one programmable sensor agent, the process may proceed to end step 418.

Figure 4B:
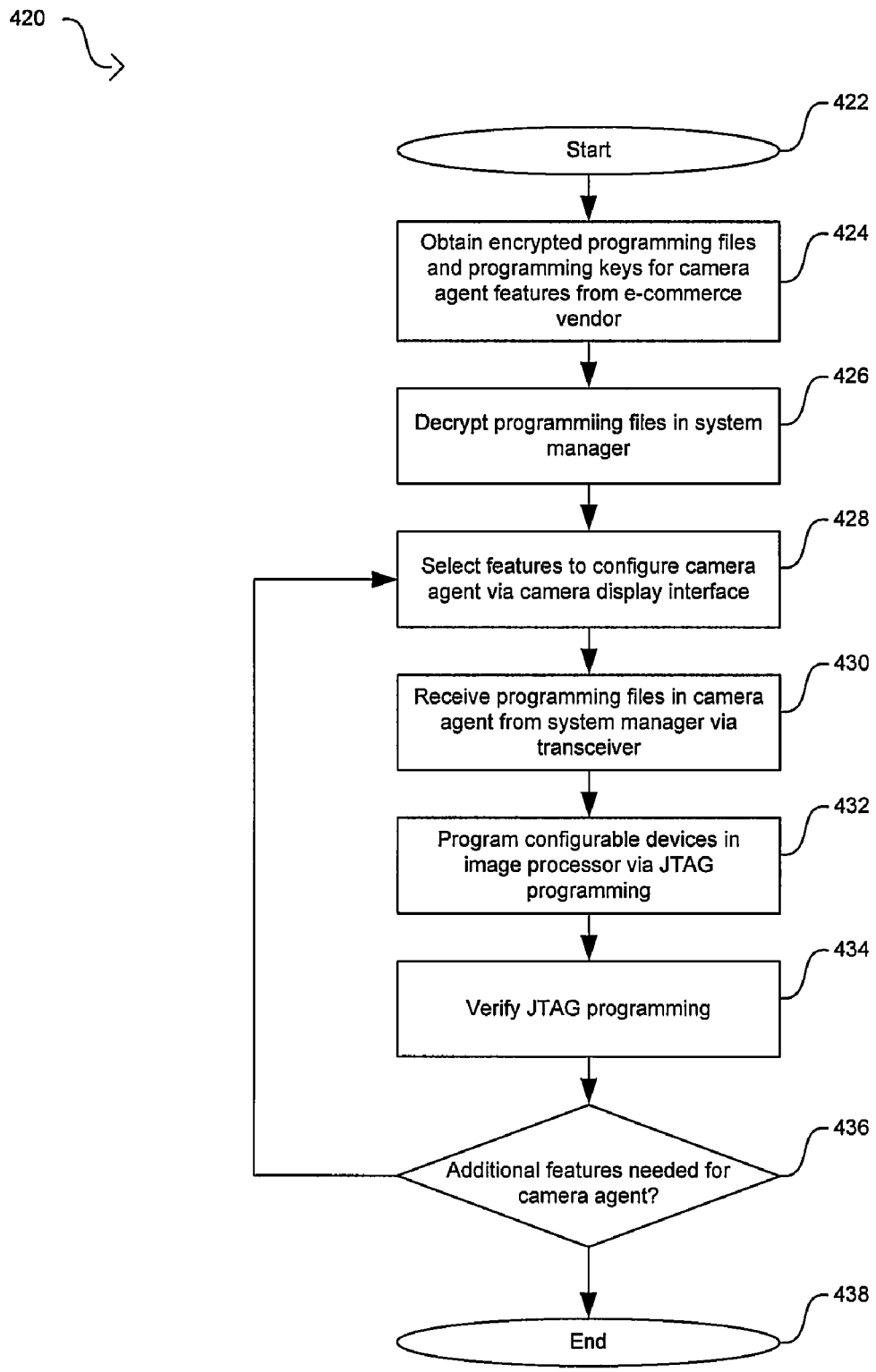
FIG. 4B is a flow diagram illustrating exemplary steps for configuring a programmable surveillance video camera via a display interface, in accordance with an embodiment of the invention.

FIG. 4B is a flow diagram illustrating exemplary steps for configuring a programmable surveillance video camera via a display interface, in accordance with an embodiment of the invention. Referring to FIG. 4B, after start step 422, in step 424, features that may be programmed into at least one configurable device in at least one programmable sensor agent in a configurable security and surveillance system may be provided by an e-commerce feature vendor. Decryption keys may be requested and obtained from the e-commerce feature vendor for device programming files that are encrypted. The device programming files and/or decryption keys may be provided to the configurable security and surveillance system via a network connection and/or via machine-readable media.

In step 426, the encrypted device programming files may be decrypted by utilizing the decryption keys received in step 404. In step 428, a user, an installer, for example, may select security features via the display 314 for configuration into the programmable sensor agent currently being attended. The selection generates a signal to the system manager 108 to transfer the corresponding device programming files to the programmable sensor agent being attended. In step 430, the programmable sensor agent being attended receives the corresponding device programming files from the system manager 108 via the transceiver 310. In step 432, the configurable devices in the image processor block 304 may be programmed by utilizing the device programming files received in step 430. The configurable devices may be programmed via the JTAG port in the host processor 306. In step 434, the host processor 306 may verify that the programming of the configurable devices in the programmable sensor agent being attended is successful. In this regard, an indication may be provided to the installer via the display 314.

In step 436, the installer may determine whether new, additional, and/or upgraded features may be necessary in the programmable sensor agent being attended. When the user finds that new, additional, and/or upgraded features are necessary, the process may proceed to step 428 where a selection may be made via the display 314. When the user may not require new, additional, and/or upgraded features in the programmable sensor agent being attended, the process may proceed to end step 438.

Figure 4C:
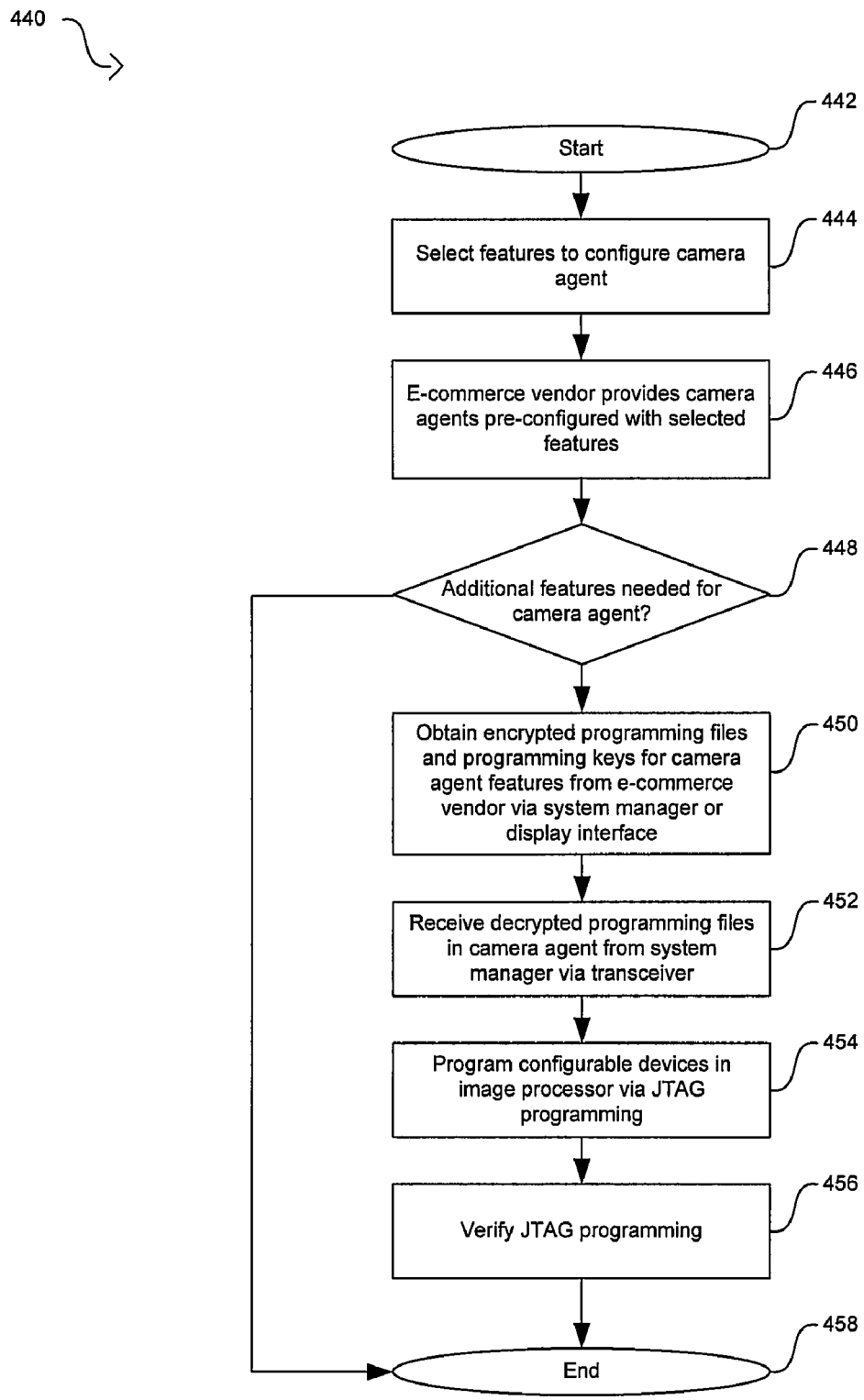
FIG. 4C is a flow diagram illustrating exemplary steps for configuring a pre-configured programmable surveillance video camera, in accordance with an embodiment of the invention.

FIG. 4C is a flow diagram illustrating exemplary steps for configuring a pre-configured programmable surveillance video camera, in accordance with an embodiment of the invention. Referring to FIG. 4C, after start step 442, in step 444, features that may be programmed into at least one configurable device in at least one programmable sensor agent in a configurable security and surveillance system may be selected and provided to the e-commerce feature vendor. In step 446, the e-commerce feature vendor may program or pre-configure the programmable sensor agents to be installed in the configurable security and surveillance system with the selected features.

In step 448, a user, installer, and/or system manager may determine whether new, additional, and/or upgraded features may be necessary in at least one of the installed programmable sensor agents in the configurable security and surveillance system. When a user may not require new, additional, and/or upgraded features in at least one programmable sensor agent, the process may proceed to end step 458. When a user may find new, additional, and/or upgraded features necessary, the process may proceed to step 450. In step 450, encrypted programming files and programming keys may be requested via the system manage 108 and/or via the display 314 and the encrypted programming files may be decrypted. In step 452, the decrypted programming files may be received via the transceiver in each of the corresponding programmable sensor agents after being communicated from, for example, the system manager 108 via the network 112. In step 454, the configurable devices in, for example, the image processor block 304 may be programmed by utilizing the device programming files received in step 454. The configurable devices may be programmed via the JTAG port in the host processor 306. In step 456, the host processor 306 may verify the programming of the configurable devices in the programmable sensor agents. After step 456, the process may proceed to end step 458.

Figure 5:
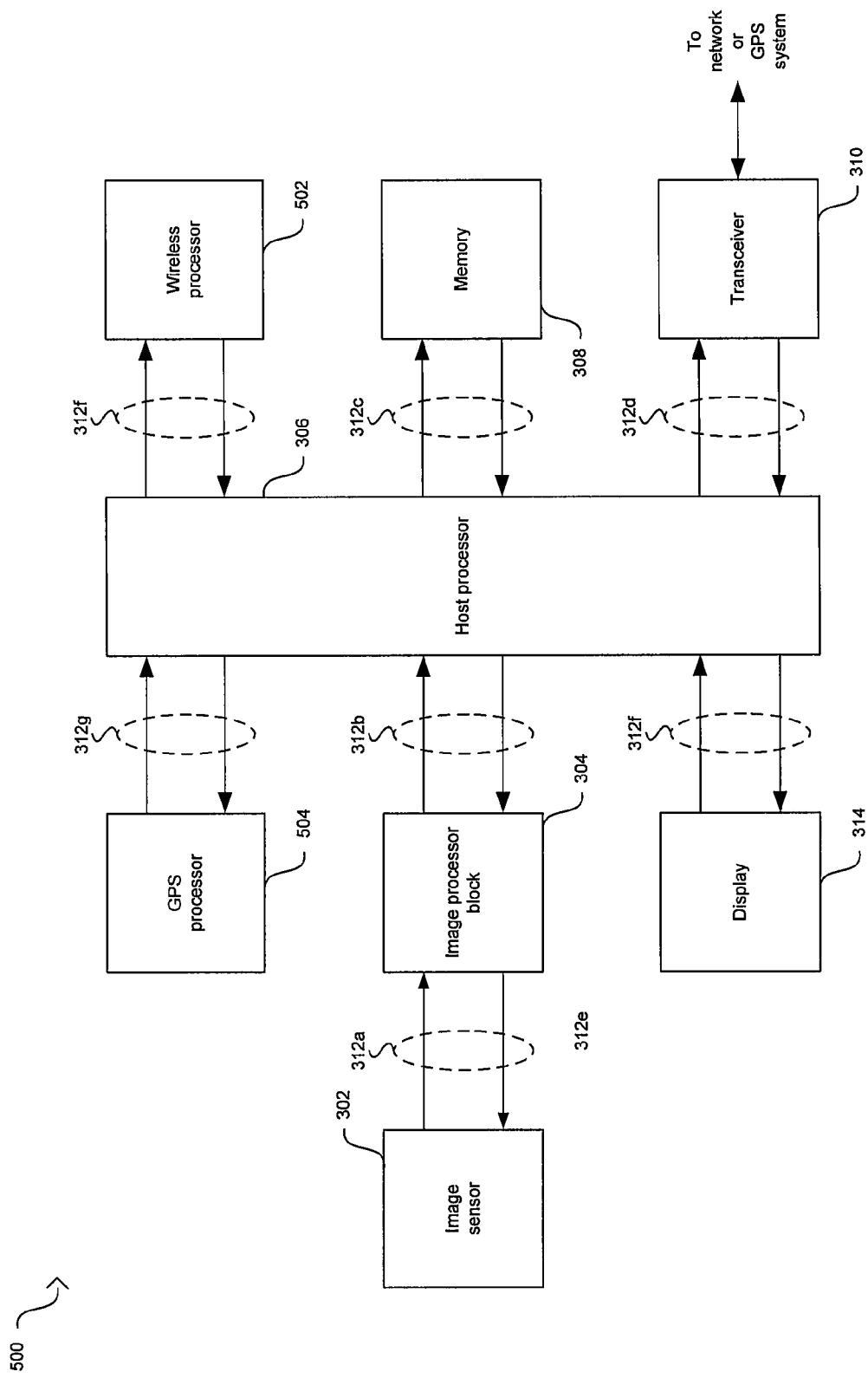
FIG. 5 is a block diagram illustrating an exemplary programmable surveillance video camera with a wireless processor and a GPS processor, in accordance with an embodiment of the invention.

FIG. 5 is a block diagram illustrating an exemplary programmable surveillance video camera with a wireless processor and a GPS processor, in accordance with an embodiment of the invention. Referring to FIG. 5, there is shown a programmable sensor agent 500 that comprises the image sensor 302, the image processor block 304, the host processor 306, the memory 308, the transceiver 310, the display 314, a wireless processor 502, and a global positioning system (GPS) processor 504. The programmable sensor agent 500 may correspond to any of a video sensor, an audio sensor, a thermal sensor, a biological sensor, a chemical sensor, and/or any other type of sensor from which metadata information may be extracted from the physically detected information.

The wireless processor 502 may comprise suitable logic, circuitry, and/or code that may be enabled to process data for wireless communication. In this regard, the wireless processor 502 may be utilized in programmable sensor agents adapted for wireless communication such as the wireless programmable sensor agent 107b described in FIG. 1A. The wireless processor 502 may be implemented as a configurable device which may be programmed or configured via the JTAG port of the host processor 306. The wireless processor 502 may support at least one wireless communication protocol such as cellular, WLAN, and/or Bluetooth, for example. The wireless processor 502 may communicate data formatted for wireless communication to the network 112 via the transceiver 310. In this regard, the network 112 may receive the data from the programmable sensor agent 500 via the wireless hub 107a, for example. The signals 312f may be utilized to transfer control and/or data information between the wireless processor 502 and the host processor 306.

The GPS processor 504 may comprise suitable logic, circuitry, and/or code that may be adapted to process geographical positioning or location data provided by a GPS system. In this regard, the positioning data may be utilized to locate mobile programmable sensor agents, for example. In other instances, the positioning data may be utilized by the image processor block 304 to generate, for example, three-dimensional information of captured images. The GPS processor 504 may be implemented as a configurable device which may be programmed or configured via the JTAG port of the host processor 306. The GPS processor 504 may communicate positioning information to the network 112 via the transceiver 310. Signals 312g may be utilized to transfer control and/or data information between the GPS processor 504 and the host processor 306.

Figure 6:
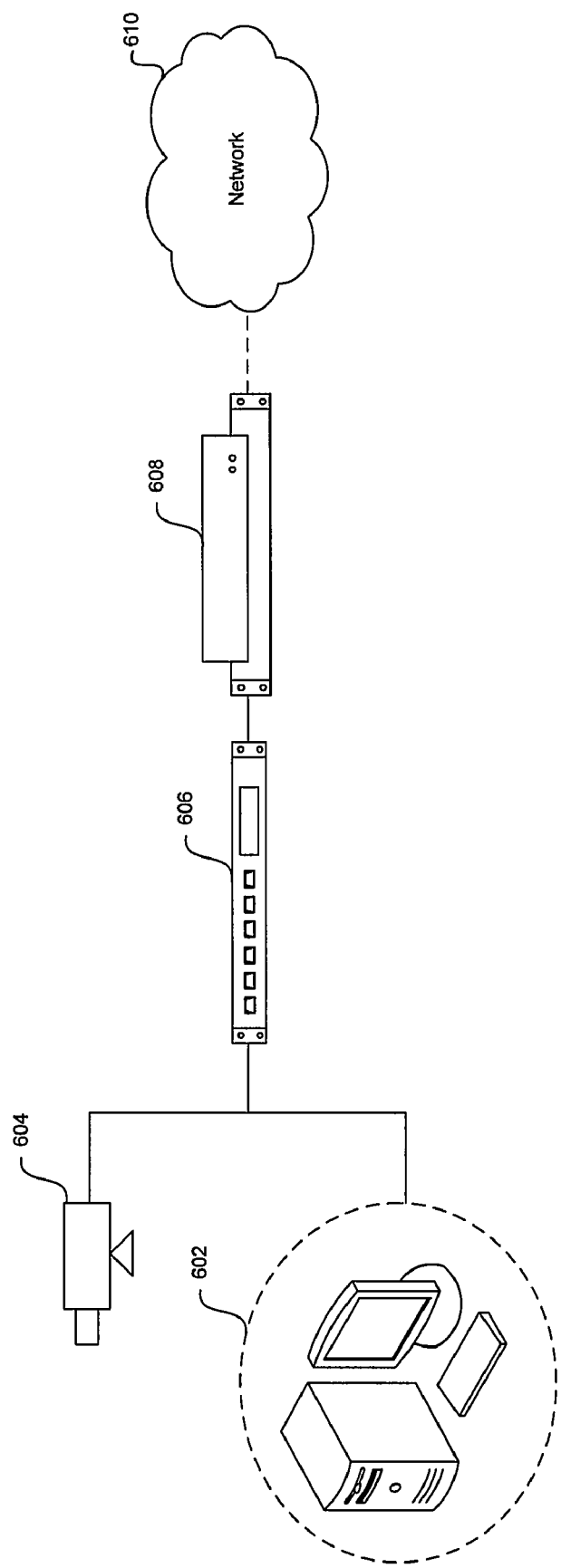
FIG. 6 is a block diagram illustrating an exemplary programmable surveillance video camera and management and content analysis system that enable generating and processing textual descriptions of objects comprised within video signals, in accordance with an embodiment of the invention.

FIG. 6 is a block diagram illustrating an exemplary programmable surveillance video camera and management and content analysis system that enable generating and processing textual descriptions of objects comprised within video signals, in accordance with an embodiment of the invention. Referring to FIG. 6, there is shown a workstation 602, a programmable surveillance video camera 604, a switch 606, a management and content analysis system 608, and a network 610. The workstation 602 may correspond to the system manager 108 disclosed in FIG. 1A. The programmable surveillance video camera 604 may correspond to the programmable sensor agents disclosed in FIGS. 3A-3E and FIG. 5, for example.

The switch 606 may comprise suitable logic, circuitry, and/or code that may enable communication between the programmable surveillance video camera 604 and the workstation 602 with the management and content analysis system 608. In some instances, more than one programmable surveillance video camera 604 may be communicatively coupled to the switch 606. Moreover, the switch 606 may enable a plurality of programmable sensor agents to communicate with the management and content analysis system 608. The management and content analysis system 608 may correspond to the programmable content analysis agent 114 disclosed in FIG. 1B. Moreover, the management and content analysis system 608 may comprise suitable digital storage capacity and may provide at least a portion of the operations of the data storage device 110, for example. The network 610 may comprise suitable logic, circuitry, and/or code that may enable the management and content analysis system 608 to communicate with other networks and/or with an e-commerce vendor, for example.

The programmable surveillance video camera 604 may be configured to extract semantic objects from the input video streams to generate textual scene descriptors which may be tracked over time and which may be stored and/or communicated through the network to devices such as the management and content analysis system 608 for providing advanced automatic video surveillance. In this regard, automatic video surveillance may refer to a set of security and surveillance operations that may be performed with minimal human input as front-end camera video content analysis enables proactive prevention techniques rather than post-fact or back-end reactive investigation as is generally done. This approach need not be limited to the use of programmable surveillance video cameras but may be applicable to any sensor where metadata may be extracted from the physical events detected by using signal processing techniques and where the extracted metadata may be translated into meaningful textual descriptors. In this regard, a description definition language (DDL) may be implemented for properly describing characteristics of the metadata information extracted from the physical events detected by the programmable sensor agents.

Moreover, textual descriptors from multiple and/or various types of sensors may be combined to provide an overall system content textual description that may be suitable for a particular type of security and surveillance application. For example, image sensors may extract two-dimensional (2D) semantically meaningful information from video signals and biological sensors may extract one-dimensional (1D) semantically meaningful information which may be combined and translated into a single or multiple textual descriptors. In this regard, the DDL for such an application may provide descriptors that enable the fusion of metadata extracted from multiple and/or various types of sensors.

Figure 7A:
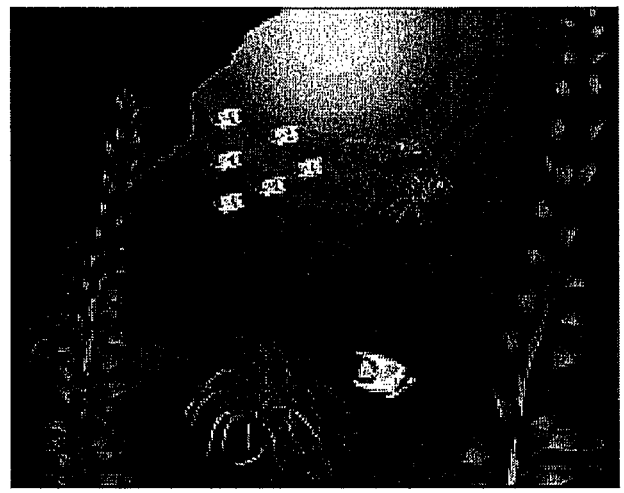
FIGS. 7A-7C illustrate a composition of an exemplary video signal into semantically meaningful background and video objects, in accordance with an embodiment of the invention.
Figure 7B:
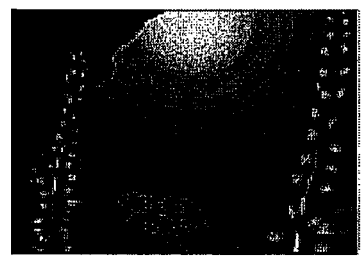
Figure 7C:

FIGS. 7A-7C illustrate a composition of an exemplary video signal into semantically meaningful background and video objects, in accordance with an embodiment of the invention. Referring to FIGS. 7A-7C, there is shown an exemplary original video stream scene that comprises a background portion and a plurality of video objects. In this regard, for purposes of semantically meaningful textual representation of video scene content, instead of decomposing a video frame into square blocks as may be done in some video compression techniques, such as MPEG-4, for example, the video scene may be decomposed into semantically meaningful entities that may be referred to as semantic video objects, video objects or video object planes (VOP). Each one of those VOPs may represent a snapshot of the corresponding video object. Since such objects may be arbitrarily shaped, the shape information may be encoded by utilizing, for example, context-based arithmetic encoding and textures by a shape-adaptative DCT. The motion of the VOPs may be encoded by motion vectors, with the block-based matching techniques having been extended to arbitrary shapes. The full video scene may be reconstructed, including the background, by a video object composition process.

The description of the background and the video object planes may be performed by utilizing a description definition language that provides textual information regarding the characteristics of each plane such as shape, location, texture, color, and/or motion, as well as general system features such as sequence name, location of sensor, links, and/or corresponding alarm types, for example. The textual description of the video scene may be communicated to, for example, the management and content analysis system 608 or to the network 610 disclosed in FIG. 6, where it may be stored for later retrieval or where it may be matched with other descriptions for automatic video surveillance operations. For example, if a programmable surveillance video camera, such as the surveillance video camera 604 in FIG. 6, may be able to textually describe objects such as fire, intruders or speeding cars so that they may be matched with a generic description of a similar object in the management and content analysis system 608, then fully automated surveillance may be achieved. Moreover, in a broadcasting application, for example, the relevant features of the moving object may be filtered automatically and may be communicated alone, thus sparing the cost of video transmission.

The semantic video objects need to be localized and tracked over time which may be challenging because physical objects are normally not homogeneous with respect to low-level features such as color, texture, or optical flow. Moreover, automatic segmentation and tracking of video scenes may require the ability to analyze partial occlusions and interacting objects. Existing localization and tracking methods that are based on change detection masks combined with an affine or perspective motion model generally fail to produce semantically meaningful objects and do not provide local motion since a single parametric motion model is generally used. Other techniques have been able to overcome this limitations by using a morphological motion filter together with a Hausdorff object tracker. However, this approach is not capable of tracking interacting objects side-by-side. Even more sophisticated algorithms exist such as the semi-automatic segmentation that utilizes 2-D mesh-based object tracking to follow the boundary, motion and intensity variations of mildly deforming objects. However, while this method accounts for occlusion, the object boundaries have to be marked manually on some key frames.

Figure 8:
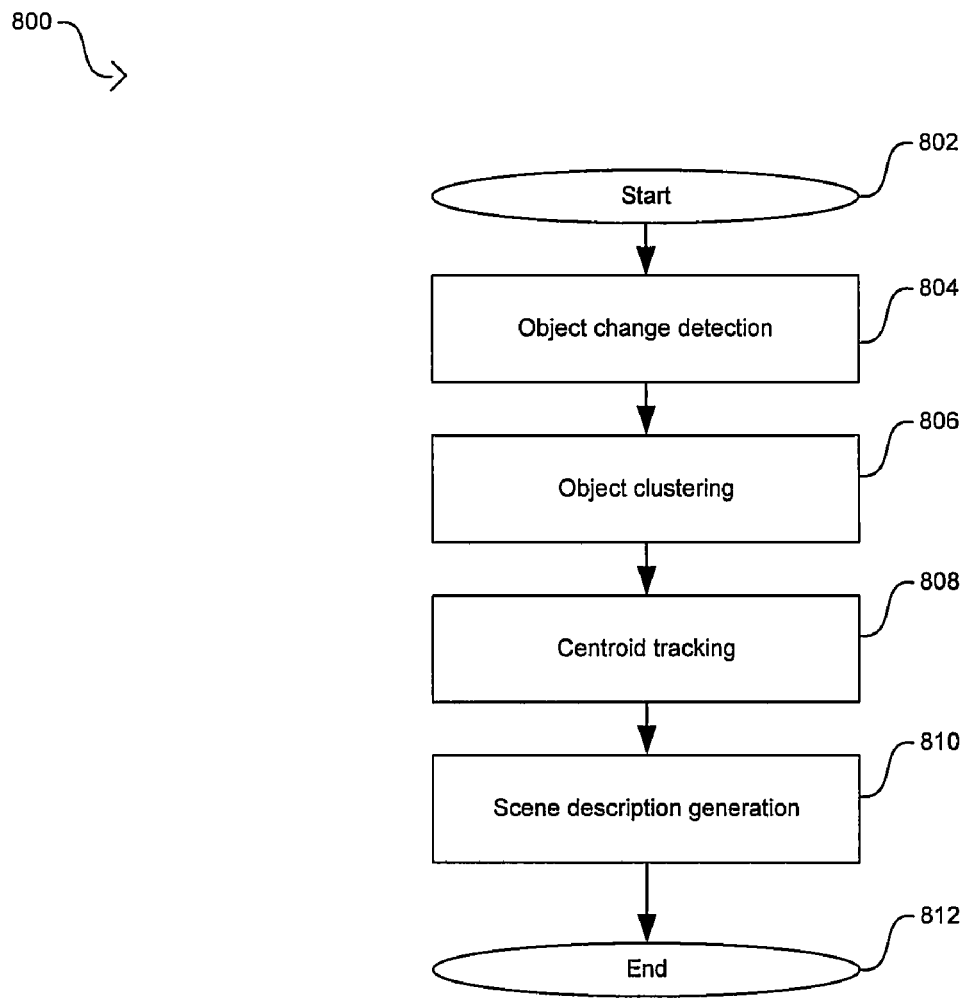
FIG. 8 is a flow diagram illustrating exemplary steps for generating textual descriptions of objects comprised within video signals, in accordance with an embodiment of the invention.

FIG. 8 is a flow diagram illustrating exemplary steps for generating textual descriptions of objects comprised within video signals, in accordance with an embodiment of the invention. Referring to FIG. 8, there is shown a flow diagram 800 that corresponds to a method for enabling semantic object detection, localization and tracking that supports partial occlusions and interacting objects that may merge or evolve together interactively. In step 804, after step 802, the image processor block 304 as disclosed in FIGS. 3A-3E may be utilized to implement a change detection mask that may be utilized for object-oriented image segmentation that enables distinguishing semantic objects from the scene background. In this regard, the change detection mask performs comparisons between the current video frame and an estimated or modeled background. As pixels that change their value are considered to be part of a semantic object of interest and may be adequately labeled. Each closed region of the change detection mask is then given a unique number in an object mask. While this approach is based on moving objects, other techniques that utilize on object databases may also be applied.

In step 806, the objects may be clustered or grouped based on the object mask generated in step 804 and on additional information such as color and/or texture features of the video scene. In step 810, a centroid or localization point may be determined for each cluster for identifying the position of the cluster by tracking the centroid location. In step 812, centroid information and object labeling information may be utilized to generate scene descriptions that may be translated into a DDL for communication to, for example, the management and content analysis system 608 or to the network 610 disclosed in FIG. 6.

Figure 9:
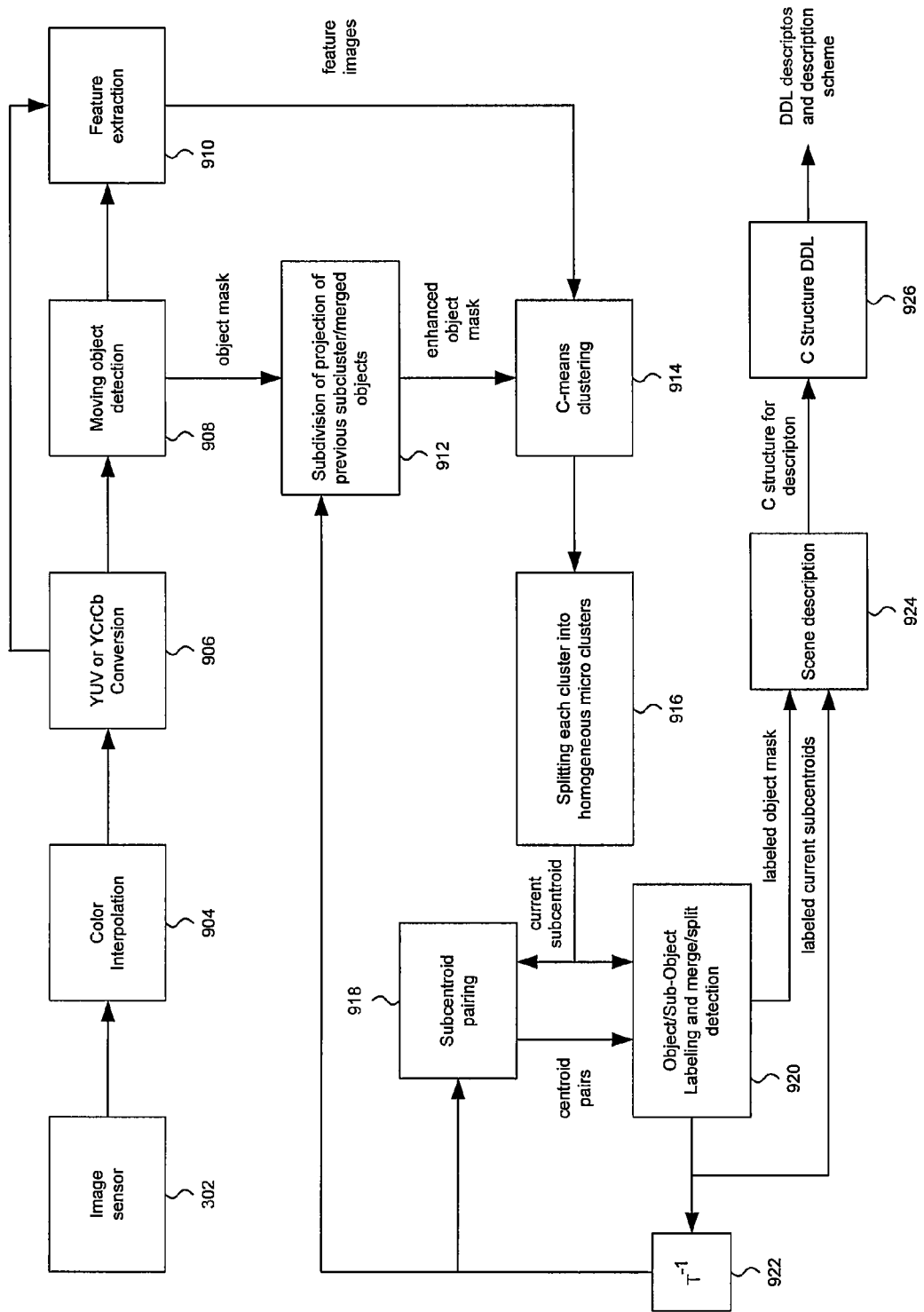
FIG. 9 is a block diagram illustrating an exemplary video processing portion of a programmable surveillance video camera for generating textual descriptions of objects comprised within video signals, in accordance with an embodiment of the invention.

FIG. 9 is a block diagram illustrating an exemplary video processing portion of a programmable surveillance video camera for generating textual descriptions of objects comprised within video signals, in accordance with an embodiment of the invention. Referring to FIG. 9, there is shown a portion of a programmable surveillance video camera as disclosed in FIGS. 3A-3B and FIG. 5, that may comprise the image sensor 302, a color interpolation 904, a YUV or YCrCb conversion 906, a moving object detection 908, a feature extraction 910, a subdivision of projection of previous subcluster/merged objects 912, a C-means clustering 914, a cluster splitting 916, a subcentroid pairing 918, an object/sub-object labeling and merge/split detection 920, a delay 922, a scene description 924, and a C structure DDL 926. At least a portion of the system shown in FIG. 9 may be implemented in the image processor block disclosed in FIGS. 3A-3E and FIG. 5.

The color interpolation 904 may comprise suitable logic, circuitry, and/or code that may enable interpolating color information received from the image sensor 302 to generate complete color planes for each of the colors supported by the color filter mosaic pattern utilized in the image sensor 302. The YUV or YCrCb conversion 906 may comprise suitable logic, circuitry, and/or code that may enable conversion of the color planes generated by the color interpolation 904 into information associated with luma and chroma pixel values.

The moving object detection 908 may comprise suitable logic, circuitry, and/or code that may utilize the luma and chroma information generated by the YUV or YCrCb conversion 906 to enable generating an object mask based on closed regions from a change detection mask. The moving object detection 908 may also provide motion information to the feature extraction 910. The feature extraction 910 may comprise suitable logic, circuitry and/or code that may enable receiving luma, chroma, and motion information to extract video scene features that may correspond to particular video objects such as motion, color, texture, and/or position, for example.

The subdivision of projection of previous subcluster/merged objects 912 may comprise suitable logic, circuitry, and/or code that may utilize the object mask generated by the moving object detection 908 and a delayed labeled current subcentroids output from the object/sub-object labeling and merge/split detection 920 to generate an enhanced object mask. The C-means clustering 914 may comprise suitable logic, circuitry, and/or code that may enable clustering objects in the video scene based on the enhanced object mask and the image features generated by the feature extraction 910. The cluster splitting 916 may comprise suitable logic, circuitry, and/or code that may enable splitting the clusters generated by the C-means clustering 914 into homogeneous micro- or sub-clusters. Moreover, the cluster splitting 916 may enable generating subcentroid information associated with each of such generated micro- or sub-clusters.

The subcentroid pairing 918 may comprise suitable logic, circuitry, and/or code that may enable pairing current subcentroid information from the cluster splitting 916 with delayed labeled current subcentroid information generated by the object/sub-object labeling and merge/split detection 920. The delay 922 may comprise suitable logic, circuitry, and/or code that may enable delaying information by one video frame or one video field, when appropriate. The object/sub-object labeling and merge/split detection 920 may comprise suitable logic, circuitry, and/or code that may enable utilizing current subcentroid and centroid pairs information to generate a labeled object mask and labeled current subcentroids for representing a current video scene.

The scene description 922 may comprise suitable logic, circuitry, and/or code that may enable receiving the labeled object mask and labeled current subcentroids from the object/sub-object labeling and merge/split detection 920 to generate a C structure for describing the current video scene. The C structure DLL 926 may comprise suitable logic, circuitry, and/or code that may enable translating the C structure description from the scene description 924 to DDL descriptors and/or some additional description scheme.

One of the important aspects of the system disclosed in FIG. 9 is the object mask generation. Since programmable surveillance video cameras are generally utilized in systems operated both outdoor and indoor, long autonomy of operation may generally be required. In this regard, when considering the background component of a video scene in determining the video objects, several considerations need to be addressed. For example, the system needs to be able to work without human interaction for a long time, and then take into account gradual or sudden changes such as illumination variation or new static objects settling in the scene, such that the background may be temporally adaptive. In addition, the system may need to discard irrelevant motion such as waving bushes or flowing water and may need to be robust to slight oscillations of the camera, such that there may be a need for local estimation for the confidence in the background value. Moreover, the system may need to operate in real-time and may need to be low power so that the algorithms may be implemented within the programmable surveillance video camera without utilizing significant resources in terms of processing power and memory.

A temporally adaptive background and the need for local estimation may require that statistical measures on the temporal activity be locally available at each pixel and that it be constantly updated. These requirements may limit the use of a single model such as the previous frame or a temporal average for the background, and global thresholding for decision. More traditional methods consist on background estimation methods that are generally based on the analysis of the histogram of the values taken by each pixel within a fixed number K of past frames. The mean, the median or the mode of the histogram may be chosen to set the background value, and the foreground may be discriminated by comparing the difference between the current frame and the background with the histogram variance. Even more sophisticated techniques, such as linear prediction, kernel density estimation, and principal component analysis (PCA), are also based on past frame history. However, these methods require great amounts of memory since a large number of frames is usually needed to achieve robustness and may therefore not be compatible with the low resource utilization requirement for programmable surveillance video cameras.

Other methods for background estimation and modeling include methods based on estimates of the mean and variance of a Gaussian distribution, or different states of the background, for example, its values and temporal derivatives, or estimated by predictive, for example, Kalman filters. However, it is difficult to get robust estimates of the background with linear recursive predictors unless a multi-modal distribution, such as multiple Gaussian, is explicitly used, which may then result in significant increases in computational complexity and memory requirements. Moreover, these methods may rely on parameters such as the learning rates used in the recursive linear filters, setting the relative weights of the background states and the new observations, which may be difficult to determine or establish and which may not be compatible with the system requirement that the background may be temporally adaptive.

For programmable surveillance video cameras that operate with temporally adaptive background, need for local estimation, require low power, and have limited resource allocation, a recursive approximation of the temporal median to compute the background may be utilized for background estimation and modeling. The method provides significant robustness by the non linearity compared to the linear recursive average and with the very low computational cost.

Figure 10:
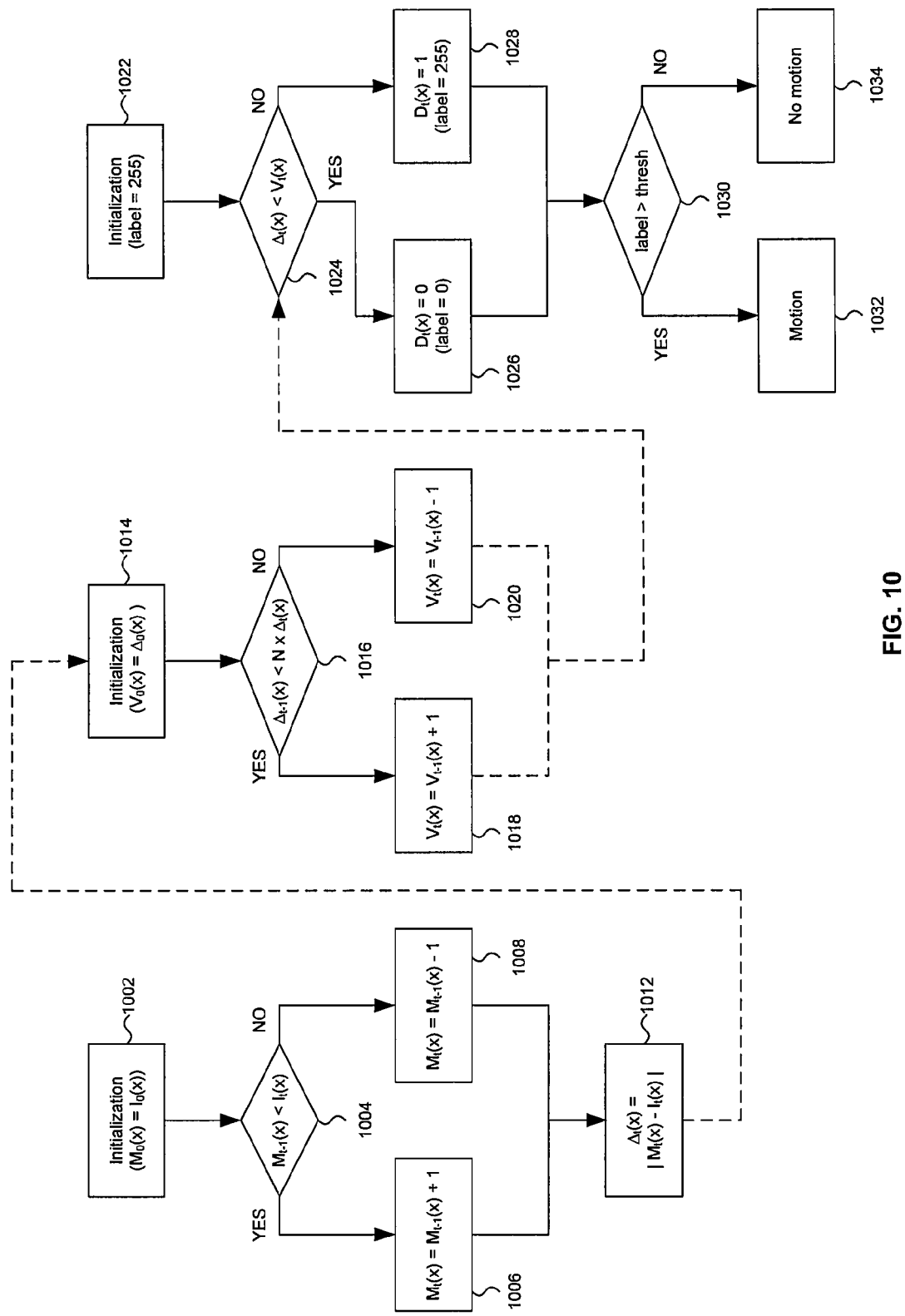
FIG. 10 is a flow diagram illustrating exemplary steps for estimating the background for generating a change detection mask and an object mask in a programmable video camera, in accordance with an embodiment of the invention.

FIG. 10 is a flow diagram illustrating exemplary steps for estimating the background for generating a change detection mask and an object mask in a programmable video camera, in accordance with an embodiment of the invention. Referring to FIG. 10, there is shown a flow diagram illustrating an exemplary method for background estimation based on a recursive approximation of the temporal median. In step 1002, an initialization operation may occur where for each pixel location, x, the estimated background value, $M_t(x)$, may be initialized to the current input sequence value, $I_t(x)$, so that $M_0(x)=I_0(x)$, where t may indicate the current frame or field when appropriate. When $I_t$ is a random discrete signal, the most probable values for $M_t$ are in a range [a,b], such that there are as many indices $\tau<t$ such that $I_\tau<a$, as there are indices $\tau>t$ such that $I_\tau>b$. In this regard, $M_t$ is an approximation of the median of $I_t$. Such a filter fulfills the need related to the change detection in a time varying signal.

In step 1004, for each pixel, when $M_{t-1}(x)<I_t(x)$, the process may proceed to step 1006 in which the current estimated background value $M_t(x)=M_{t-1}(x)+1$. Otherwise, the process may proceed to step 1008 in which the current estimated background value $M_t(x)=M_{t-1}(x)-1$. In step 1012, a first observation field, $\Delta_t(x)$, may be determined by the absolute difference between the current input sequence value, $I_t(x)$, and the estimated background value, $M_t(x)$, so that $\Delta_t(x)=|M_t(x)-I_t(x)|$. In this regard, $\Delta_t(x)$ may correspond to the time variance of the pixels, representing their motion activity measure in order to determine whether the pixel is more likely moving or stationary.

In step 1014, an initialization operation may occur where for each pixel location, x, the second observation field, $V_t(x)$, may be initialized to the current first observation field value, $\Delta_t(x)$, so that $V_0(x)=\Delta_0(x)$, where t may indicate the current frame or field when appropriate. The second observation field, $V_t(x)$, may have the dimensions of a temporal standard deviation since it is determined based on the differences of the first observation field value, $\Delta_t(x)$. This provides a measure of the temporal activity of the pixel. In step 1016, for each pixel such that $\Delta_t(x) \neq 0$, when $\Delta_{t-1}(x)<N \times \Delta_t(x)$, the process may proceed to step 1018 in which the current second observation field value $V_t(x)=V_{t-1}(x)+1$. Otherwise, the process may proceed to step 1020 in which the current second observation field value $V_t(x)=V_{t-1}(x)-1$. Since the interest is in pixels whose variation rate is significant over its temporal activity, the filter in step 1016 is applied to a sequence of N times the non-zero differences, where the value of N may be programmable.

In step 1022, an initialization operation may occur where a label value may be initialized to, for example, 255, for an 8-bit value. In step 1024, for each pixel, when $\Delta_t(x)<V_t(x)$, the process may proceed to step 1026 in which a current detection field value $D_t(x)=0$ with a corresponding label=0. Otherwise, the process may proceed to step 1028 in which the current detection field value $D_t(x)=1$ with a corresponding label=255. The detection field value $D_t(x)$ may be a Boolean indicator. In step 1030, when the label value is higher than a programmable threshold value, thresh, the process may proceed to step 1032 where the pixel under consideration is considered to be in motion. Otherwise, the process may proceed to step 1034 where the pixel under consideration is considered not to be in motion. Motion information may then be utilized to determine the background component of a video scene and to construct the change detection mask and object mask utilized for tracking and localizing video objects comprised within the video scene.

Figure 11A:
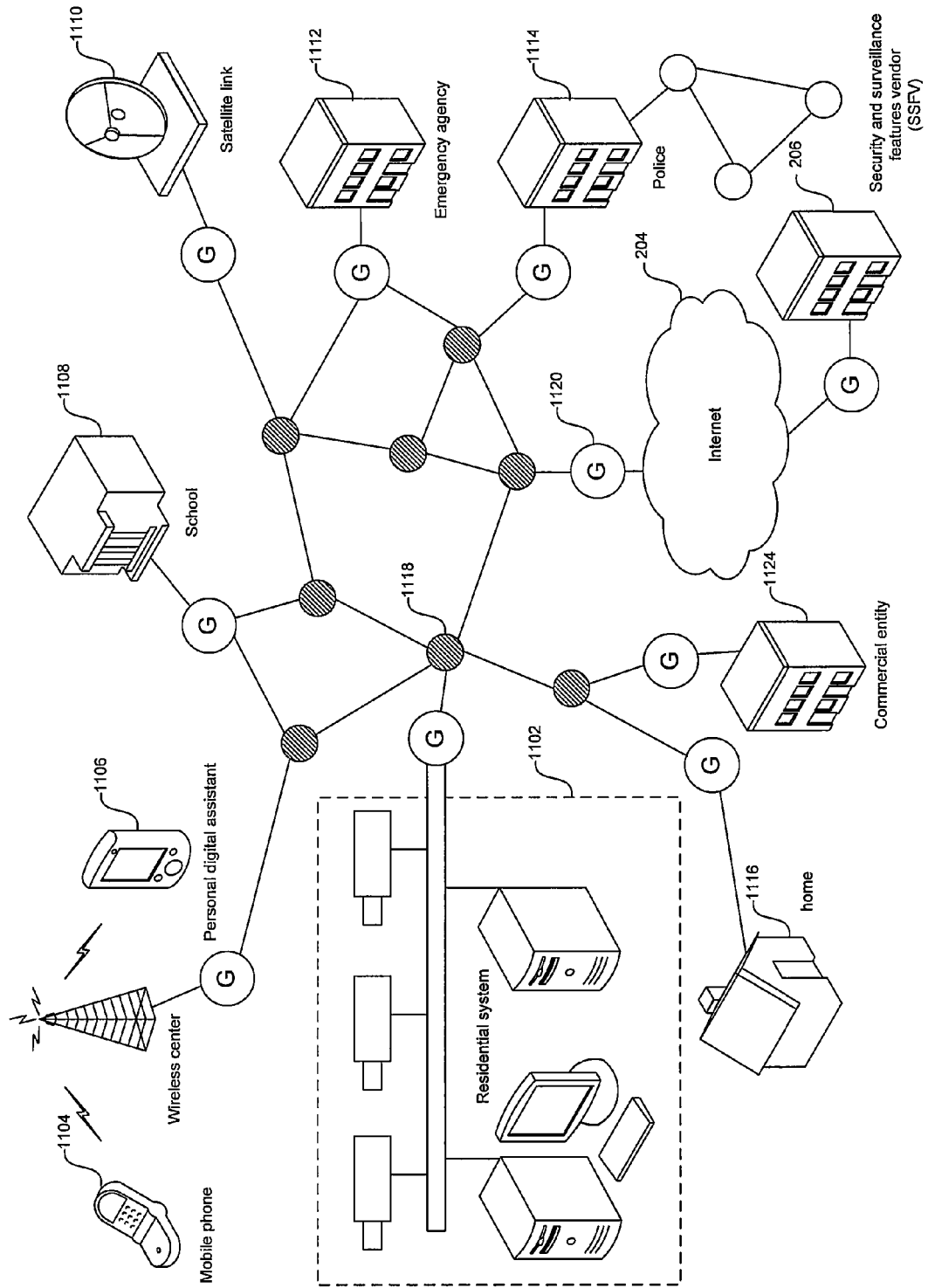
FIG. 11A illustrates an exemplary network comprising a residential configurable security and surveillance system, in accordance with an embodiment of the invention.

FIG. 11A illustrates an exemplary network comprising a residential configurable security and surveillance system, in accordance with an embodiment of the invention. Referring to FIG. 11A, there is shown a network that comprises a residential configurable security and surveillance system 1102 substantially as described in FIGS. 1A-1B, a mobile phone 1104, a wireless center 1126, a personal digital assistant (PDA) 1106, a school 1108, a satellite link 1110, an emergency agency 1112, a police center 1114, a home 1116, at least one core router 1118, at least one gate router 1120, a commercial entity 1124, a security and surveillance features vendor (SSFV) 206 as described in FIG. 2A, and a TCP/IP network 204 also as described in FIG. 2A. The core router 1118 and/or the gate router 1120 may be adapted to support wireless and/or wireline communication. The residential configurable security and surveillance system 1102 may be adapted to provide security functions for a home and/or small commercial entities, for example. Moreover, new, additional, and/or upgraded features may be provided periodically and/or routinely by the SSFV 206 as a result of a commercial agreement.

In operation, the SSFV 206 may provide device programming files and/or decryption keys to configure the configurable security and surveillance system 1102 via the TCP/IP network 204 and the network of at least one gate router 1120 and at least one core router 1118. The features provided by the device programming files may support access to the configurable security and surveillance system 1102 via the mobile phone 1104 and/or the PDA 1106 to a user. The user may utilize the mobile phone 1104 and/or the PDA 1106 as an interface to control at least a portion of the operations and/or display at least a portion of the contents generated by the configurable security and surveillance system 1102. In this regard, the user may utilize the network of at least one gate router 1120 and at least one core router 1118 to communicatively couple the wireless center 1126 and the configurable security and surveillance system 1102.

The configurable security and surveillance system 1102 may be adapted to generate appropriate emergency signals and/or alarms to, for example, the school 1108, the satellite link 1110, the emergency agency 1112, the police center 1114, the commercial entity 1124, and/or at least one home 1116 in accordance with the features configured into the residential configurable security and surveillance system 1102. For example, security breaches may be reported to any of these locations in accordance to the features supported by the residential configurable security and surveillance system 1102. The types of security breaches and/or the locations to which the appropriate emergency signals are sent may depend on the security features received from the SSFV 206.

Figure 11B:
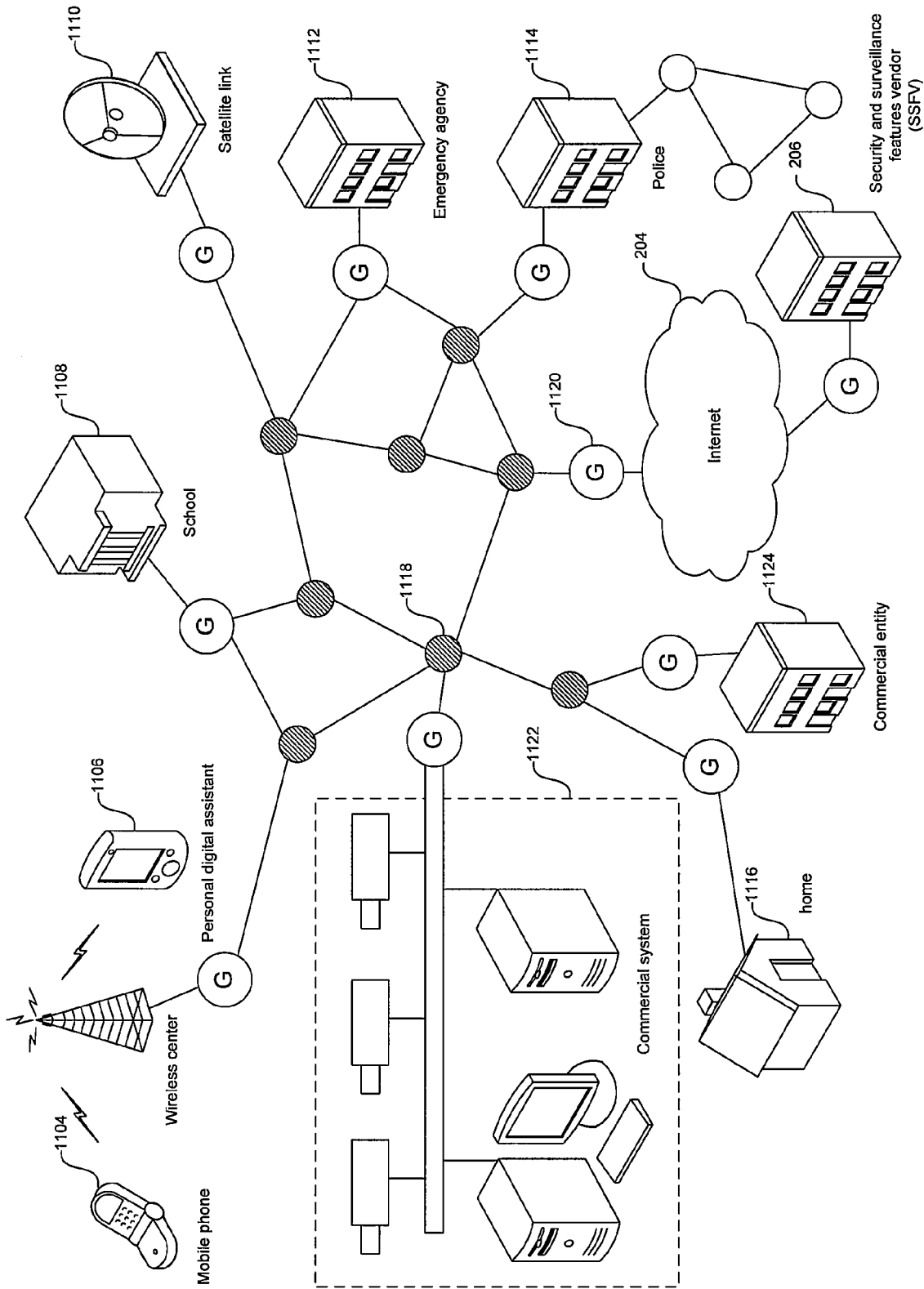
FIG. 11B illustrates an exemplary network comprising a commercial configurable security and surveillance system, in accordance with an embodiment of the invention.

FIG. 11B illustrates an exemplary network comprising a commercial configurable security and surveillance system, in accordance with an embodiment of the invention. Referring to FIG. 11B, there is shown a network that differs from the network shown in FIG. 11A in that a commercial configurable security and surveillance system 1122 is utilized. The commercial configurable security and surveillance system 1122 may provide security functions for a large commercial entities and/or governmental entities, for example. In this regard, the commercial configurable security and surveillance system 1122 may support a large number and wide range of programmable sensor agents and/or programmable content analysis agents. Moreover, new, additional, and/or upgraded features may be provided periodically and/or routinely by the SSFV 206 as a result of a commercial agreement, for example.

The approach described herein may result in more effectively and/or efficiently integrated security and surveillance systems. The use of configurable devices in the programmable sensor agents provides significant flexibility in the system architecture and may also increase the length of operation of a security and surveillance system before significant investments are required. In this regard, a user may determine the security functions and features necessary to their security operations while maintaining the ability to add and/or modify their security operations without having to replace significant portions of their existing hardware and/or software. Moreover, in video surveillance applications, the configuration or programming of video processing applications that enable the generation of semantically meaningful information comprised within video scene descriptors may further improve the efficiency and flexibility of the integrated security and surveillance system by enabling applications such as automatic image classification and/or image retrieval, for example.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for image processing, the method comprising:
    detecting within a programmable surveillance video camera one or more objects in a video signal based on an object mask generated from said video signal;
    generating within said programmable surveillance video camera a textual representation of at least a portion of said video signal by utilizing a description definition language (DDL) to indicate characteristics of said detected one or more objects, wherein said object mask is generated based on a detection field value generated for each pixel in at least a portion of said video signal by comparing a first observation field and a second observation field associated with each of said pixels; and generating said second observation field associated with each of said pixels based on a temporal difference between a previous value of said first observation field and a factored (N) current value of said first observation field for each of said pixels.

2. A method for image processing, the method comprising:
detecting within a programmable surveillance video camera one or more objects in a video signal based on an object mask generated from said video signal;
generating within said programmable surveillance video camera a textual representation of at least a portion of said video signal by utilizing a description definition language (DDL) to indicate characteristics of said detected one or more objects, wherein said object mask is generated based on a detection field value generated for each pixel in at least a portion of said video signal by comparing a first observation field and a second observation field associated with each of said pixels;
generating an estimated background value for each of said pixels; and
generating said first observation field associated with each of said pixels based on a difference between an input video signal value and said generated estimated background value for each of said pixels.

3. A non-transitory machine-readable storage having stored thereon, a computer program having at least one code section for image processing, the at least one code section being executable by a machine for causing the machine to perform steps comprising:
detecting within a programmable surveillance video camera one or more objects in a video signal based on an object mask generated from said video signal;
generating within said programmable surveillance video camera a textual representation of at least a portion of said video signal by utilizing a description definition language (DDL) to indicate characteristics of said detected one or more objects, wherein said object mask is generated based on a detection field value generated for each pixel in at least a portion of said video signal by comparing a first observation field and a second observation field associated with each of said pixels; and
generating said second observation field associated with each of said pixels based on a temporal difference between a previous value of said first observation field and a factored (N) current value of said first observation field for each of said pixels.

4. A non-transitory machine-readable storage having stored thereon, a computer program having at least one code section for image processing, the at least one code section being executable by a machine for causing the machine to perform steps comprising:
detecting within a programmable surveillance video camera one or more objects in a video signal based on an object mask generated from said video signal;
generating within said programmable surveillance video camera a textual representation of at least a portion of said video signal by utilizing a description definition language (DDL) to indicate characteristics of said detected one or more objects, wherein said object mask is generated based on a detection field value generated for each pixel in at least a portion of said video signal by comparing a first observation field and a second observation field associated with each of said pixels;
generating an estimated background value for each of said pixels; and
generating said first observation field associated with each of said pixels based on a difference between an input video signal value and said generated estimated background value for each of said pixels.

5. A system for image processing, the system comprising:
one or more processors within a programmable surveillance video camera that enable detecting one or more objects in a video signal based on an object mask generated from said video signal;
said one or more processors enable generating within said programmable surveillance video camera, of a textual representation of at least a portion of said video signal by utilizing a description definition language (DDL) to indicate characteristics of said detected one or more objects, wherein said object mask is generated based on a detection field value generated for each pixel in at least a portion of said video signal by comparing a first observation field and a second observation field associated with each of said pixels; and
said one or more processors enable generating said second observation field associated with each of said pixels based on a temporal difference between a previous value of said first observation field and a factored (N) current value of said first observation field for each of said pixels.

6. A system for image processing, the system comprising:
one or more processors within a programmable surveillance video camera that enable detecting one or more objects in a video signal based on an object mask generated from said video signal;
said one or more processors enable generating within said programmable surveillance video camera, of a textual representation of at least a portion of said video signal by utilizing a description definition language (DDL) to indicate characteristics of said detected one or more objects, wherein said object mask is generated based on a detection field value generated for each pixel in at least a portion of said video signal by comparing a first observation field and a second observation field associated with each of said pixels;
said one or more processors enable generating an estimated background value for each of said pixels; and
said one or more processors enable generating said first observation field associated with each of said pixels based on a difference between an input video signal value and said generated estimated background value for each of said pixels.

* * * * *